(12) United States Patent
Castro Castro et al.

(10) Patent No.: US 10,326,604 B2
(45) Date of Patent: Jun. 18, 2019

(54) POLICY AND CHARGING RULES FUNCTION (PCRF) SELECTION

(71) Applicant: Telefonaktiebolaget LM Ericsson (publ), Stockholm (SE)

(72) Inventors: Fabian Castro Castro, Arillo/Oleiros/A Coruña (ES); Susana Fernandez Alonso, Madrid (ES)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 22 days.

(21) Appl. No.: 15/321,375

(22) PCT Filed: Jul. 4, 2014

(86) PCT No.: PCT/EP2014/064344
§ 371 (c)(1),
(2) Date: Dec. 22, 2016

(87) PCT Pub. No.: WO2016/000793
PCT Pub. Date: Jan. 7, 2016

(65) Prior Publication Data
US 2017/0163432 A1 Jun. 8, 2017

(51) Int. Cl.
*H04W 8/08* (2009.01)
*H04M 15/00* (2006.01)
(Continued)

(52) U.S. Cl.
CPC ...... *H04L 12/1407* (2013.01); *H04L 65/1016* (2013.01); *H04M 15/57* (2013.01);
(Continued)

(58) Field of Classification Search
CPC ....... H04W 8/04; H04W 8/082; H04M 15/66; H04M 15/8033
See application file for complete search history.

(56) References Cited

U.S. PATENT DOCUMENTS 8,903,059 B2 * 12/2014 Riley .................. H04L 12/1407
370/467
2009/0305684 A1 * 12/2009 Jones ...................... H04L 63/20
455/418

(Continued)

OTHER PUBLICATIONS

Title: PCRF Selection for the S2c Reference Point; Source: Telecom Italia; 3GPP TSG SA WG2 Architecture—S2#60; Kobe, Japan; A WG2 Temporary Document (S2-074010)—Oct. 8-12, 2007.

(Continued)

*Primary Examiner* — Asghar H Bilgrami
(74) *Attorney, Agent, or Firm* — Baker Botts, LLP

(57) ABSTRACT

This specification faces the issue of unnecessary signalling between PCRF clients and the PCRF, where there is just one PCRF, and the issue of selecting by PCRF clients a right PCRF, where there are more than one PCRF. To solve these issues, this specification provides for PCC deployment information stored in a subscriber database and transmitted to a final node, likely through intermediate nodes. This PCC deployment information identifies one or more PCC interfaces that apply for a UE and, for each of the one or more PCC interfaces, at least one node that requires contacting a PCRF node identified by a PCRF address. A node receiving the PCC deployment information determines, based on the PCC deployment information, whether a PCRF node has to be contacted and, if it is determined that the PCRF node has to be contacted, such node initiates a session with the PCRF node identified by the corresponding PCRF address.

34 Claims, 14 Drawing Sheets

(51) Int. Cl.
*H04L 12/14* (2006.01)
*H04L 29/06* (2006.01)
*H04W 8/06* (2009.01)
*H04W 8/04* (2009.01)

(52) U.S. Cl.
CPC ....... *H04M 15/66* (2013.01); *H04M 15/8033* (2013.01); *H04M 15/8228* (2013.01); *H04W 8/04* (2013.01); *H04W 8/065* (2013.01); *H04W 8/082* (2013.01)

(56) References Cited

U.S. PATENT DOCUMENTS

| | | | |
|---|---|---|---|
| 2014/0233432 A1* | 8/2014 | Lim | H04L 63/20 370/259 |
| 2015/0319314 A1* | 11/2015 | Miller | H04L 41/0893 455/404.1 |
| 2016/0127564 A1* | 5/2016 | Sharma | H04L 41/0893 455/406 |
| 2017/0150332 A1* | 5/2017 | Palanisamy | H04W 4/70 |

OTHER PUBLICATIONS

Title: BBER Relocation—GW Control Session Establishment Improvements; Source: Alcatel-Lucent; 3GPP TSG SA WG2 Meeting #67; Sophia Antipolis, France (TD S2-085739)—Aug. 25-29, 2008.

International Search Report for International application No. PCT/EP2014/064344—dated Jan. 8, 2015.

3rd Generation Partnership Project; Technical Specification Group Services and System Aspects; General Packet Radio Service (GPRS) Enhancements for Evolved Universal Terrestrial Radio Access Network (E-UTRAN) Access (Release 12); 3GPP TS 23.401 v12.3.0—Dec. 2013.

3rd Generation Partnership Project; Technical Specification Group Services and System Aspects; Policy and Charging Control Architecture (Release 12); 3GPP TS 23.203 v12.3.0—Dec. 2013.

* cited by examiner

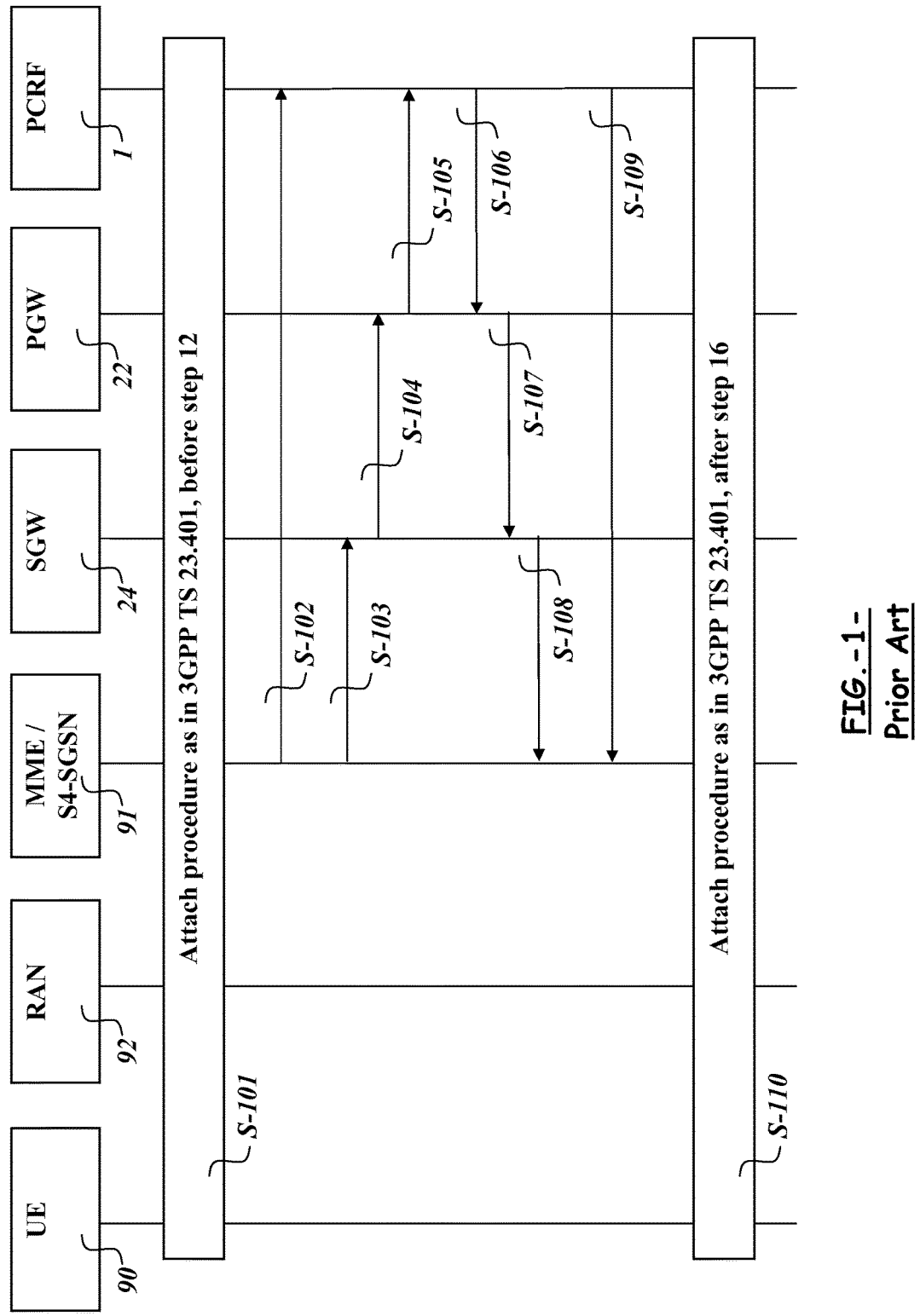
FIG. -1-
Prior Art

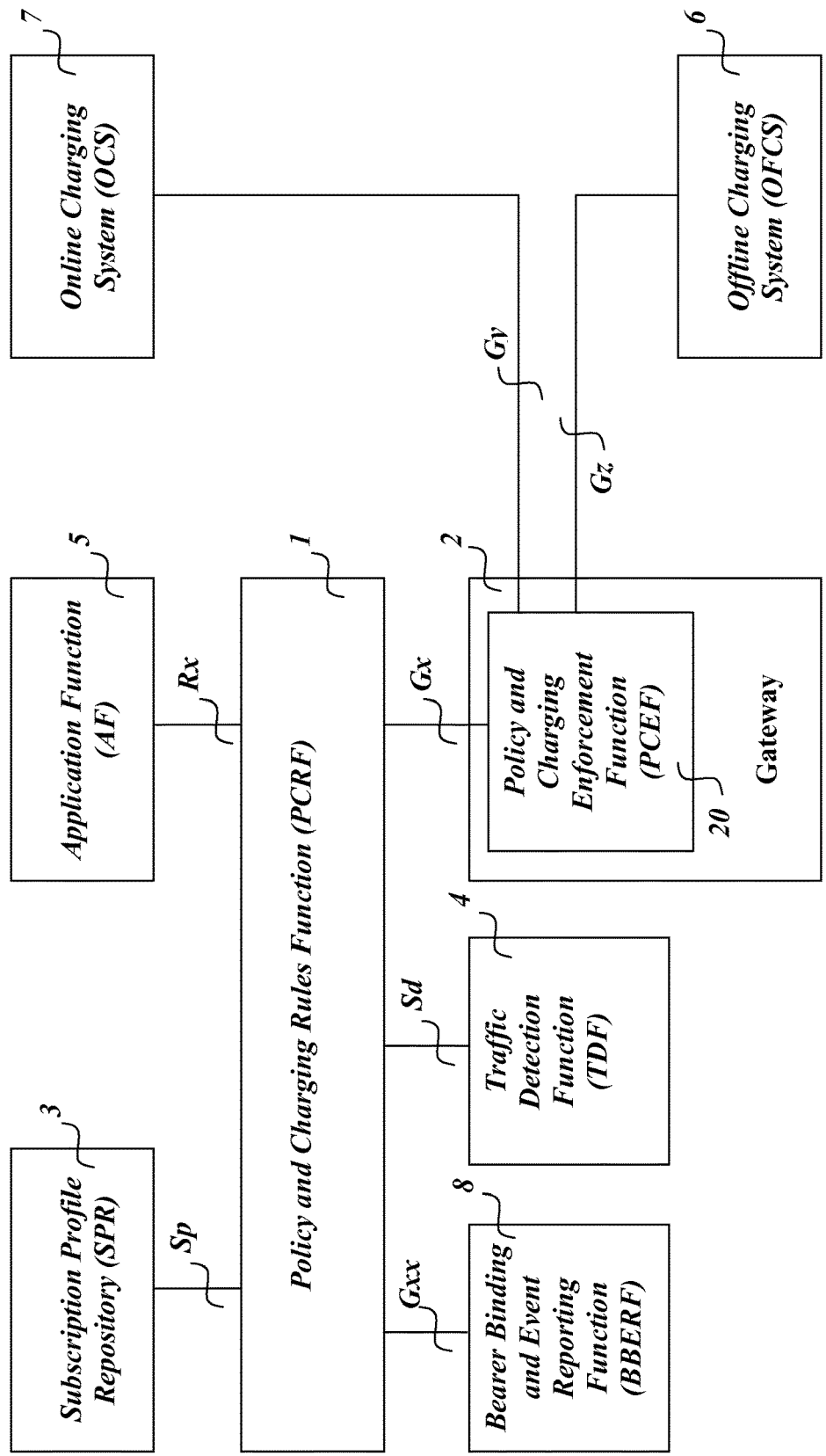
FIG. -2-

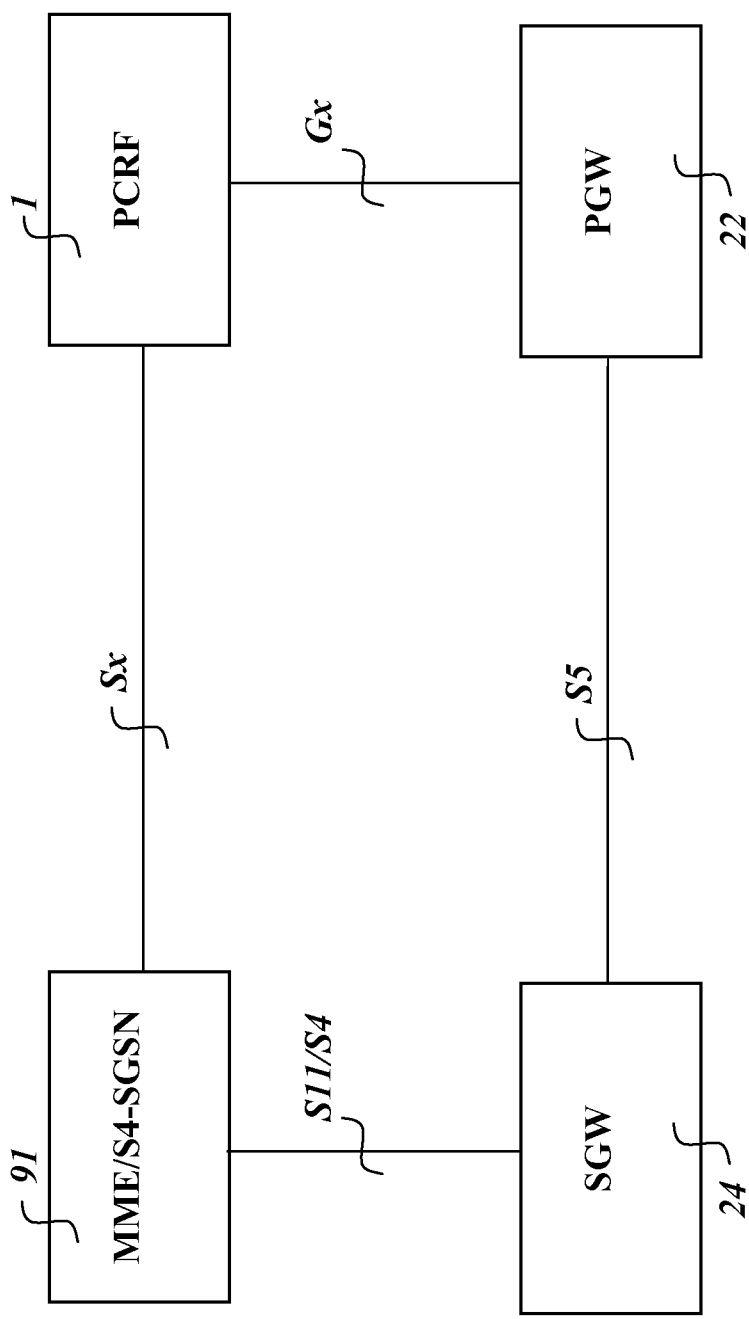
FIG. -3-

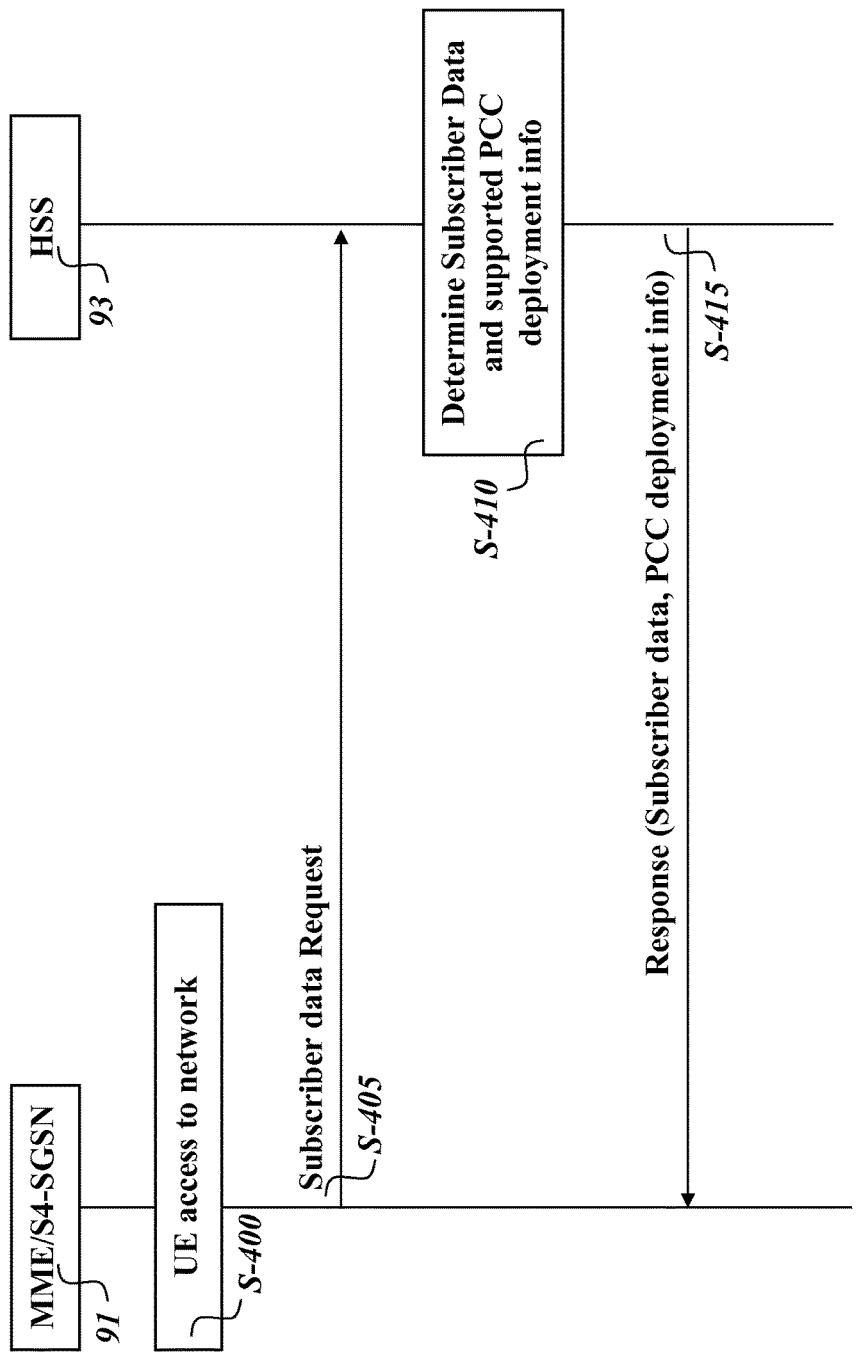
FIG. -4-

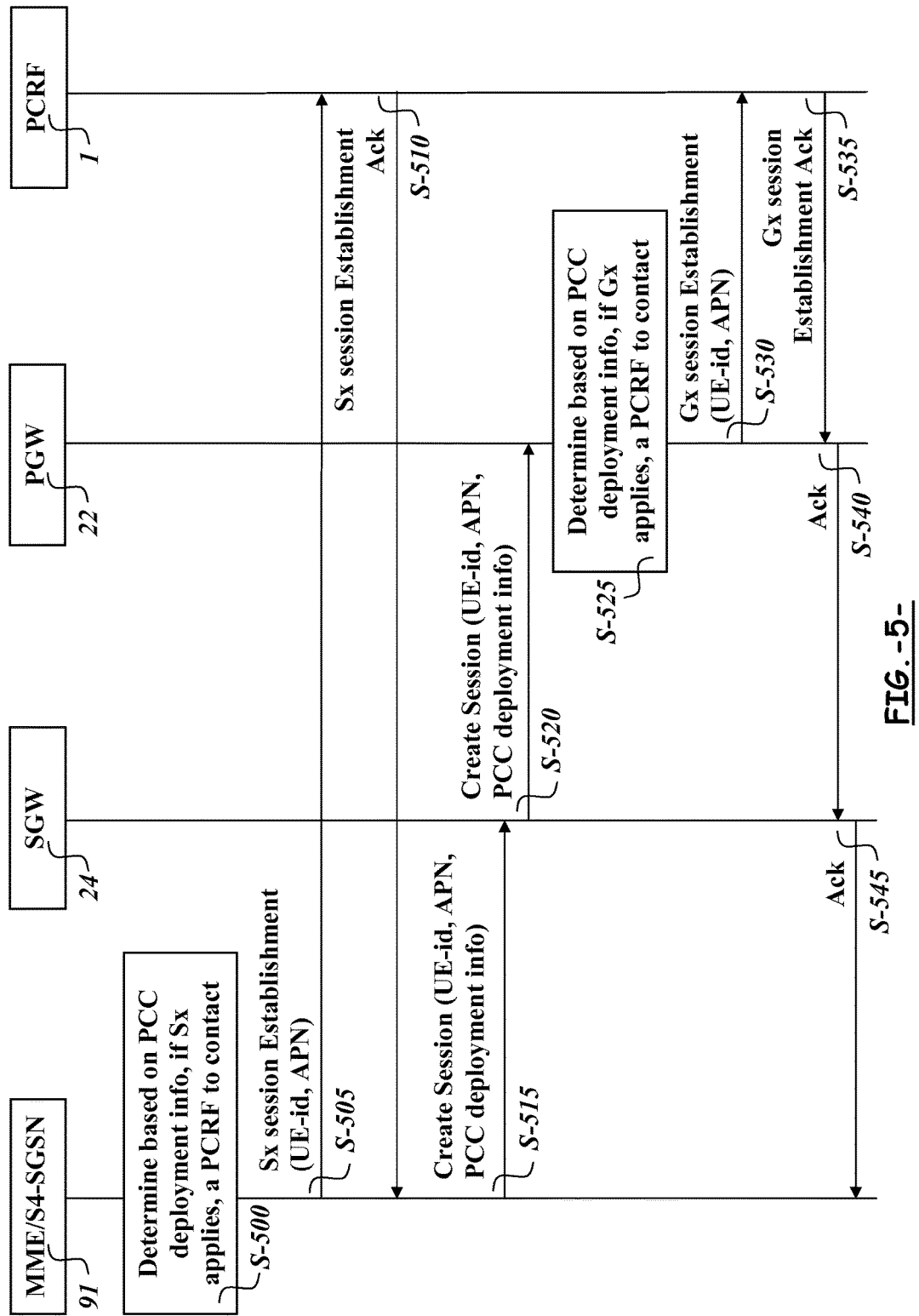
FIG. -5-

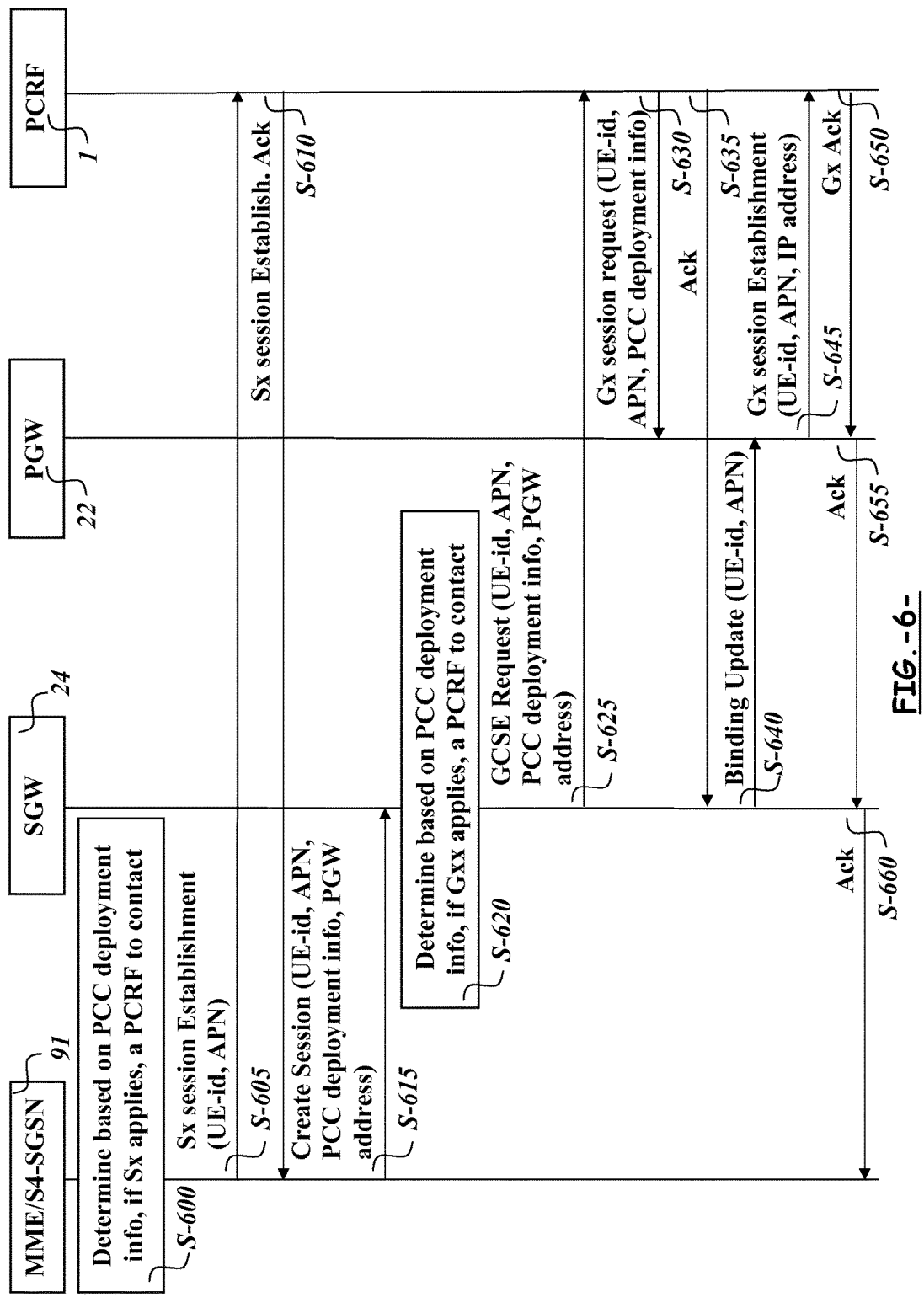
FIG. -6-

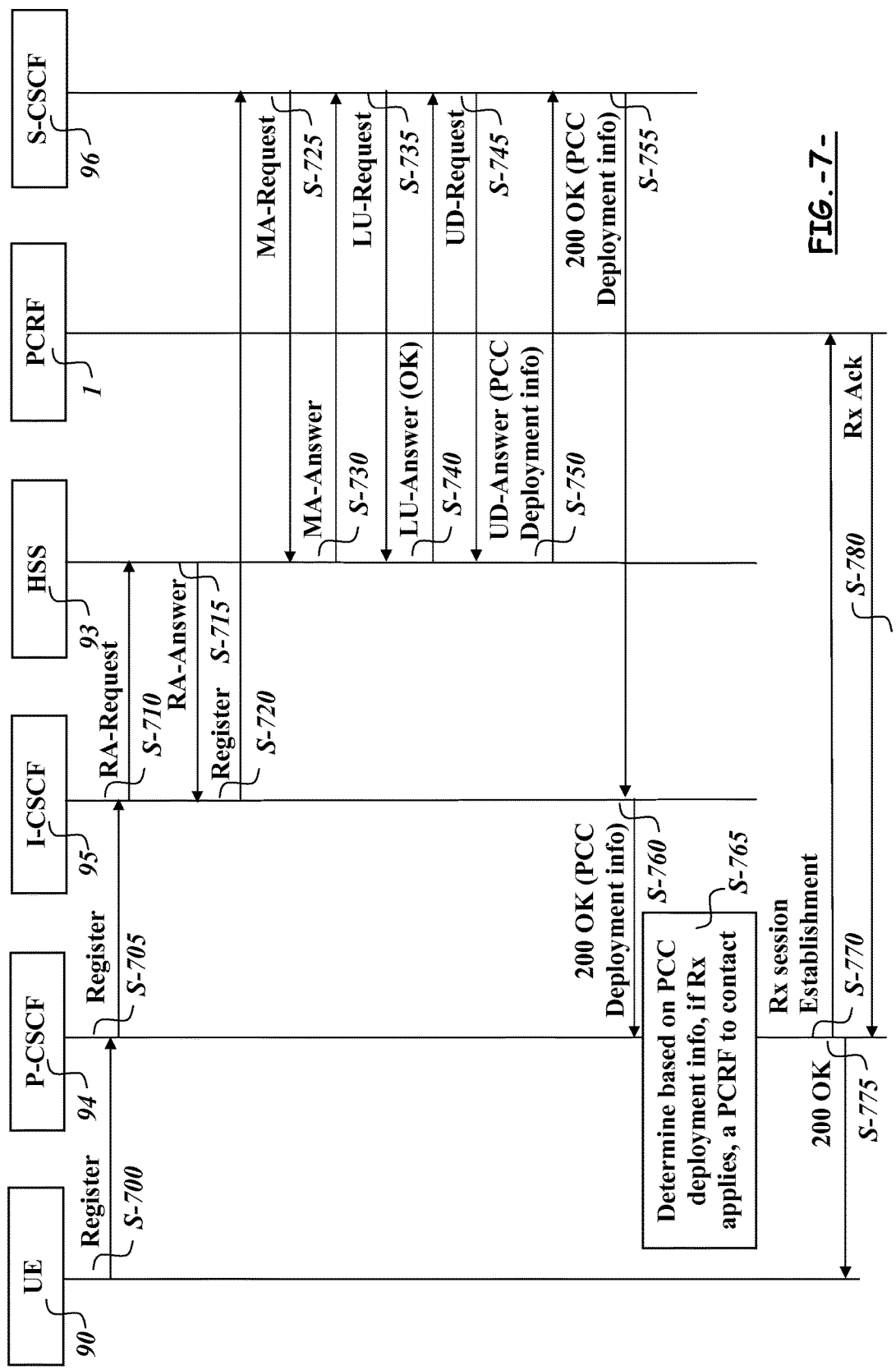
FIG. -7-

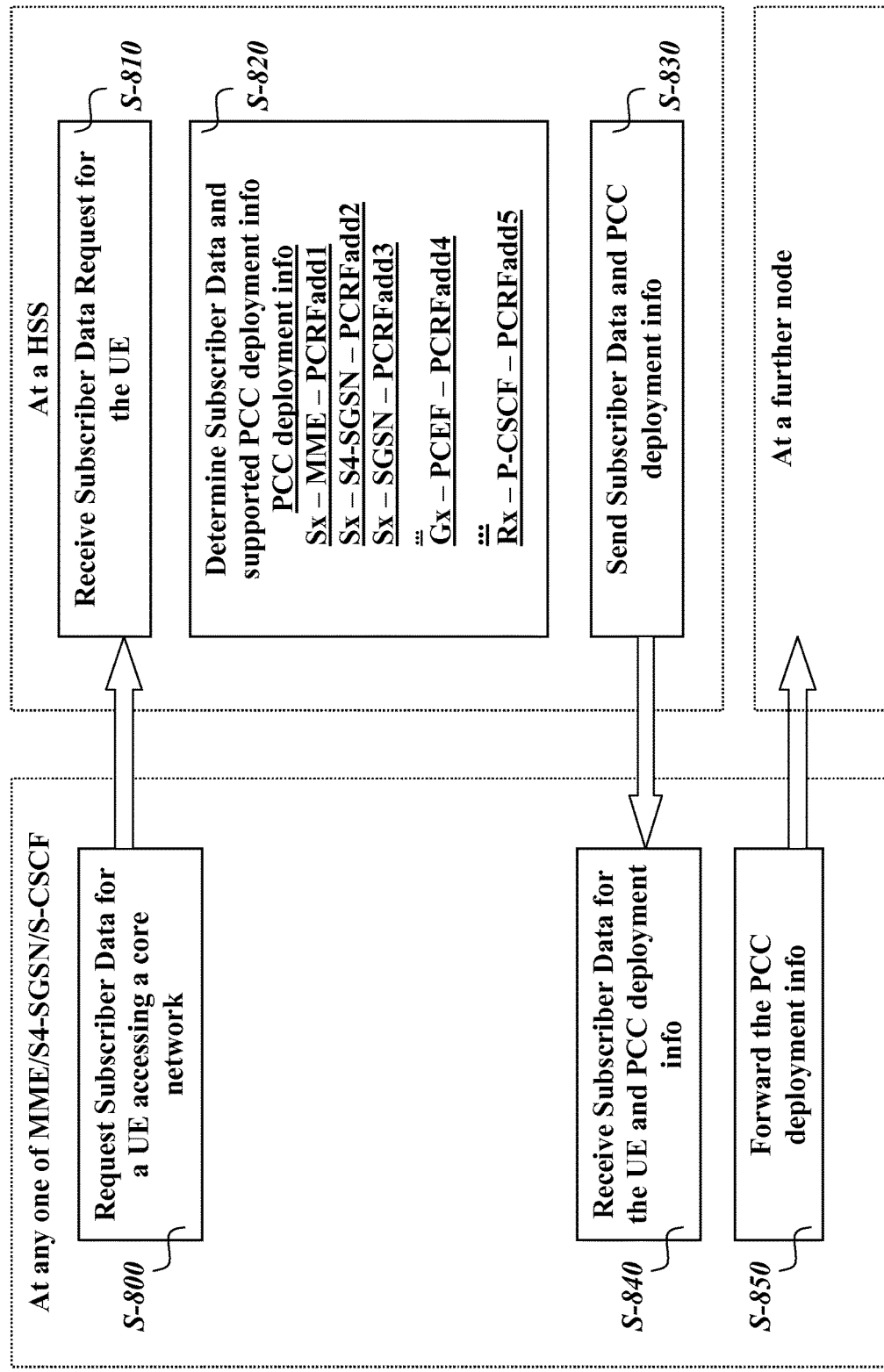
FIG. -8-

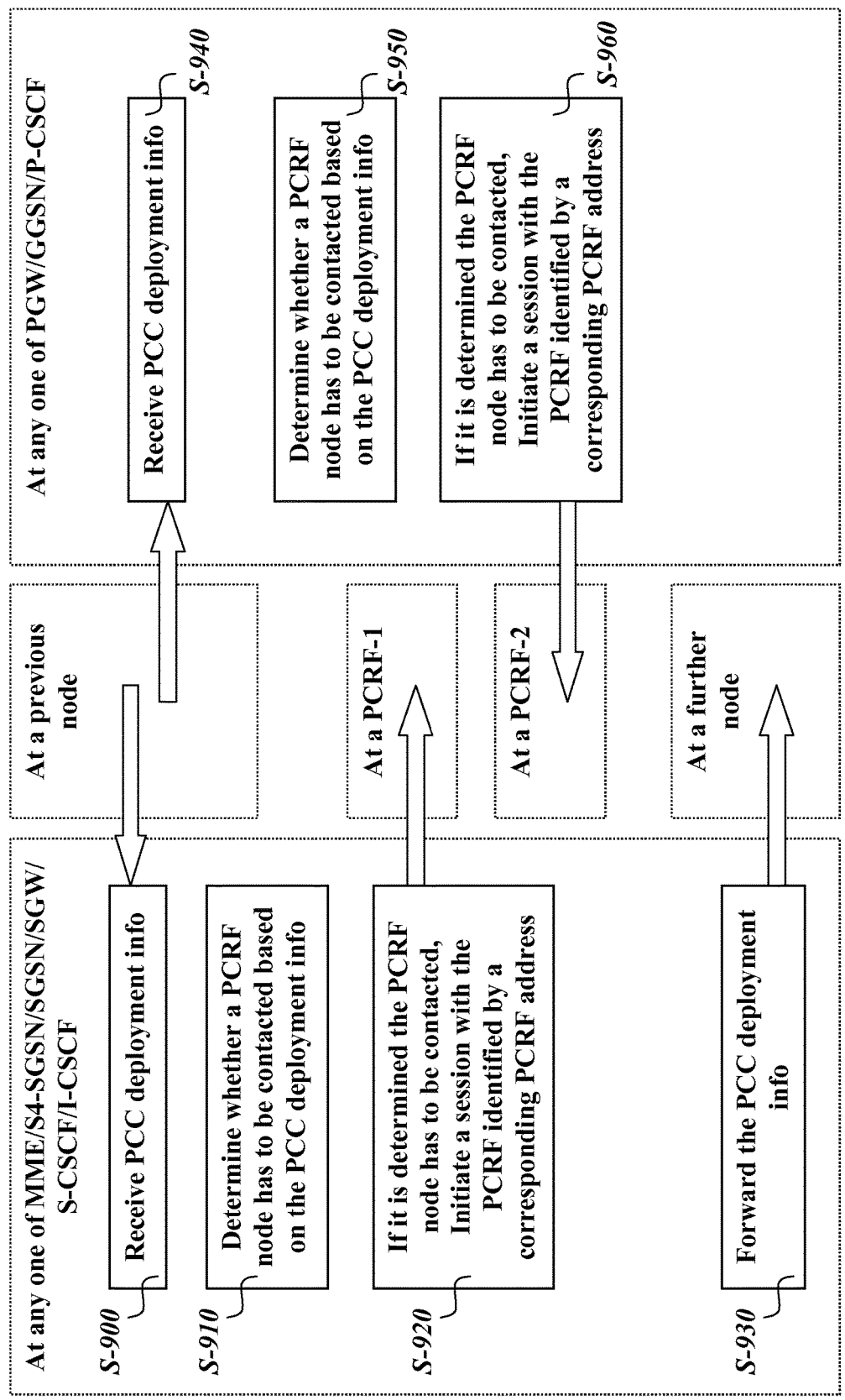
FIG. -9-

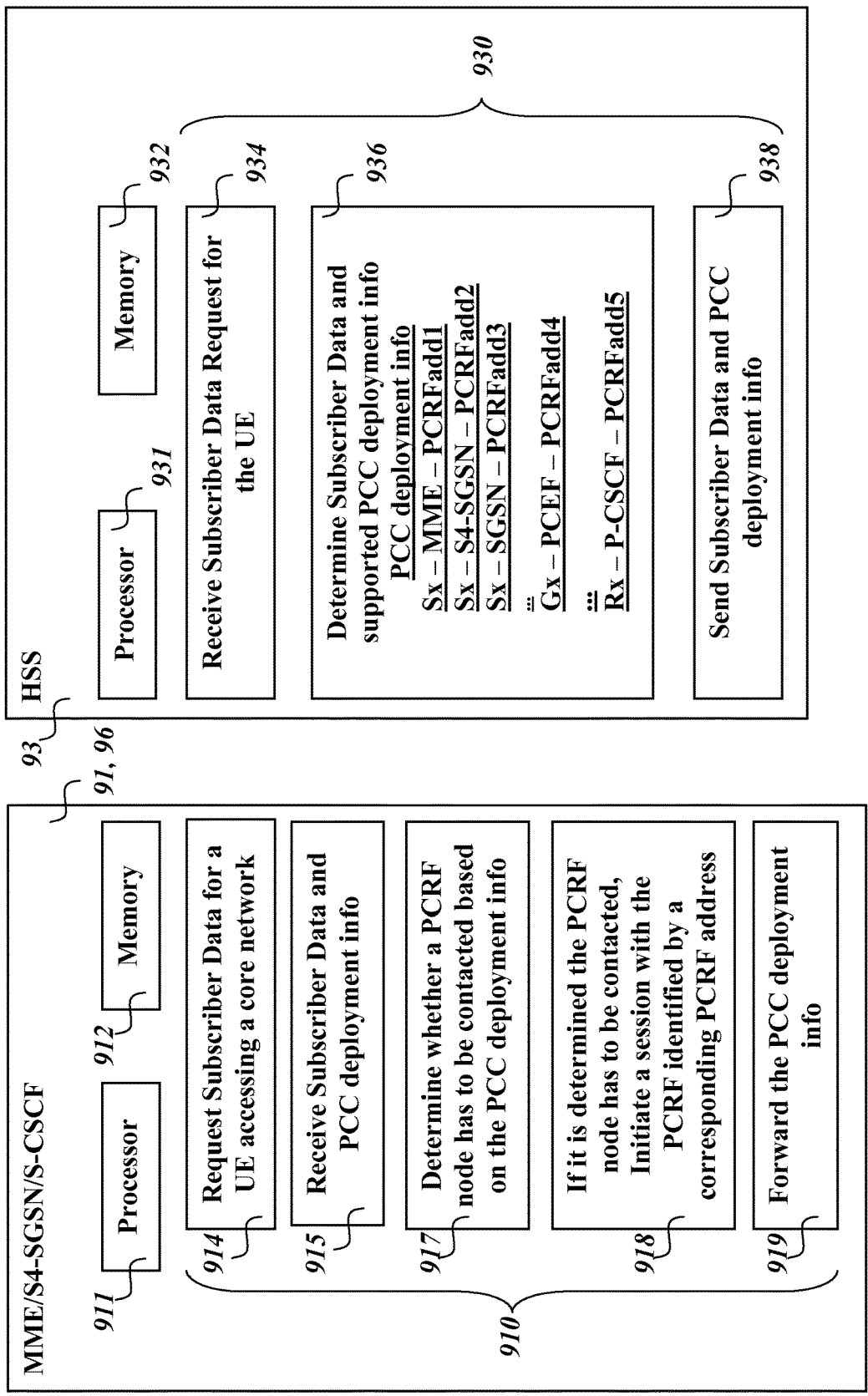
FIG. -10-

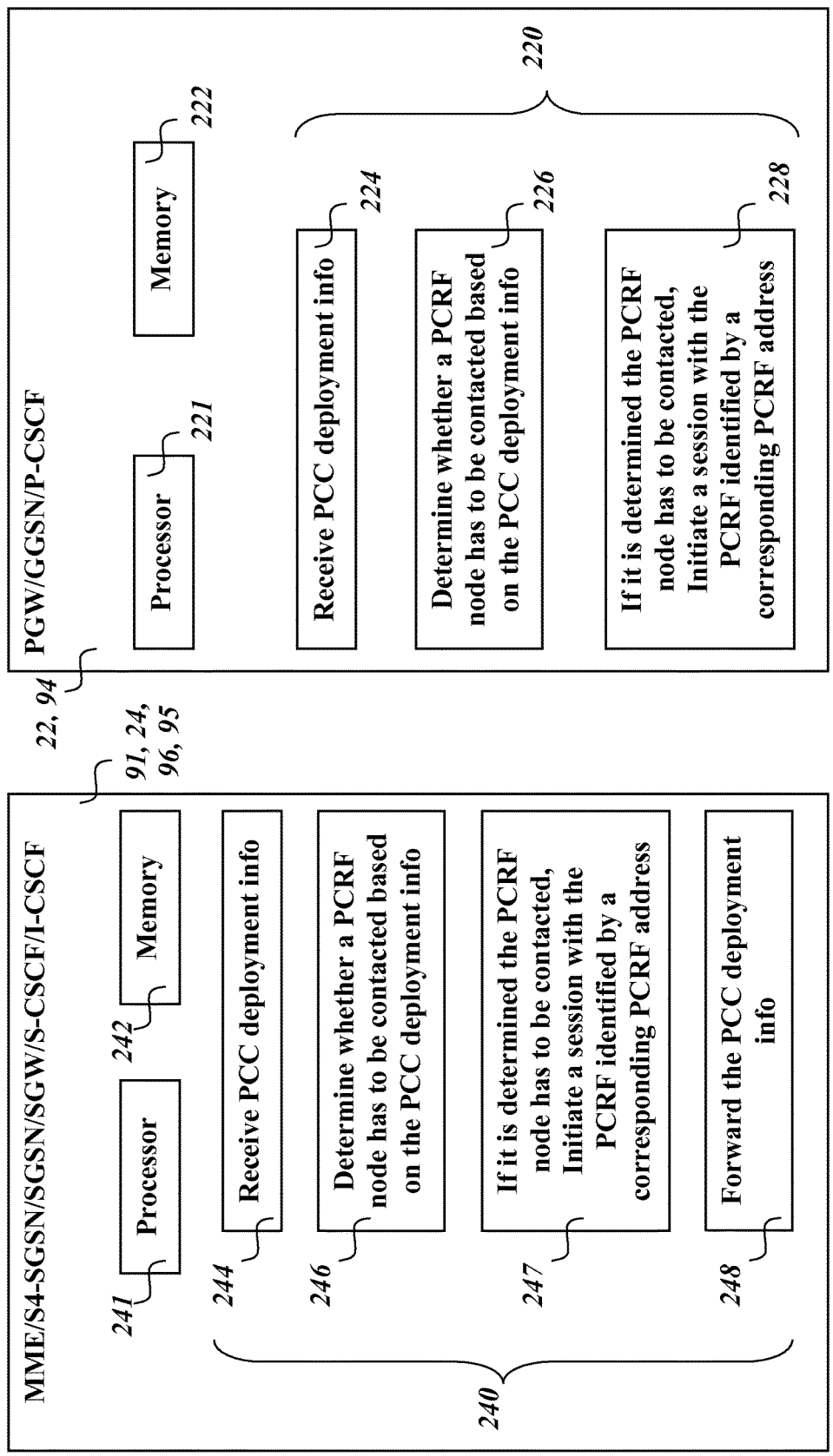
FIG. -11-

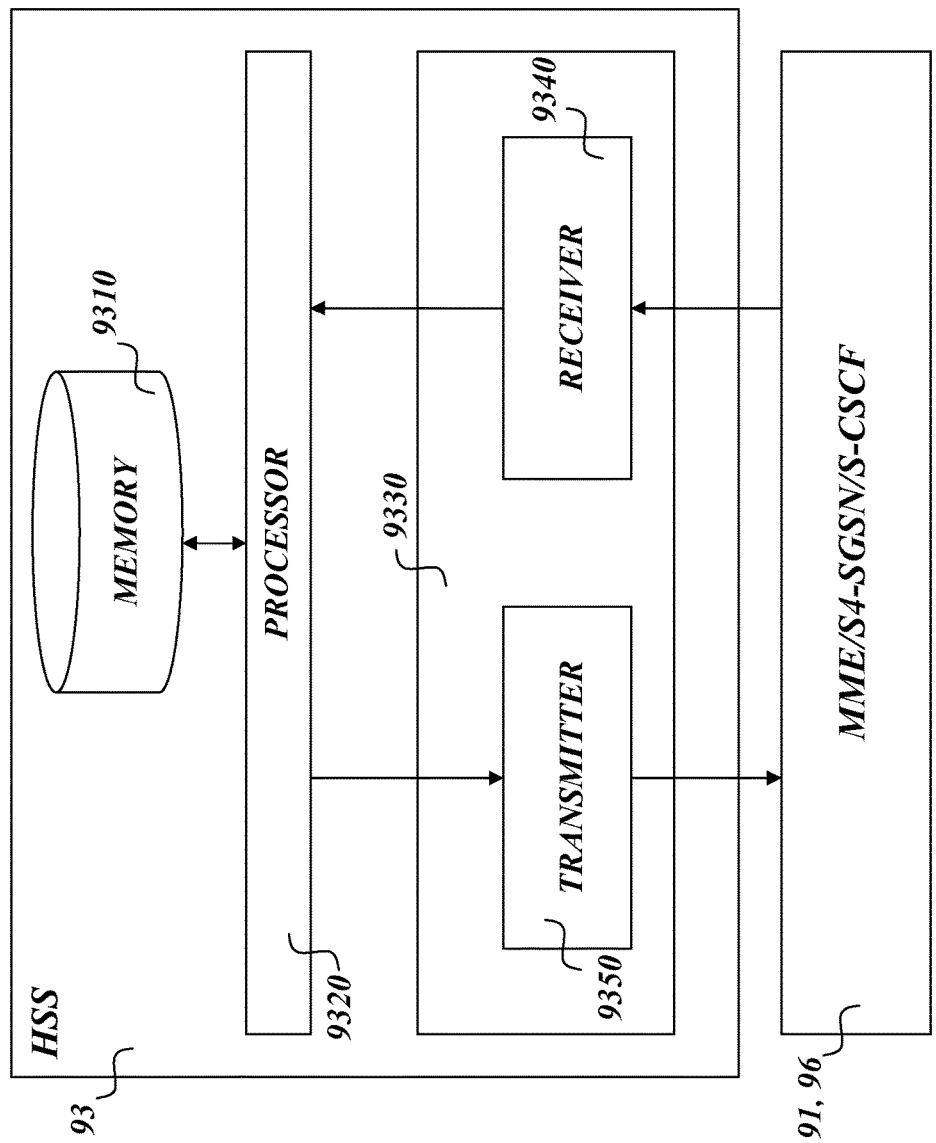
FIG. -12-

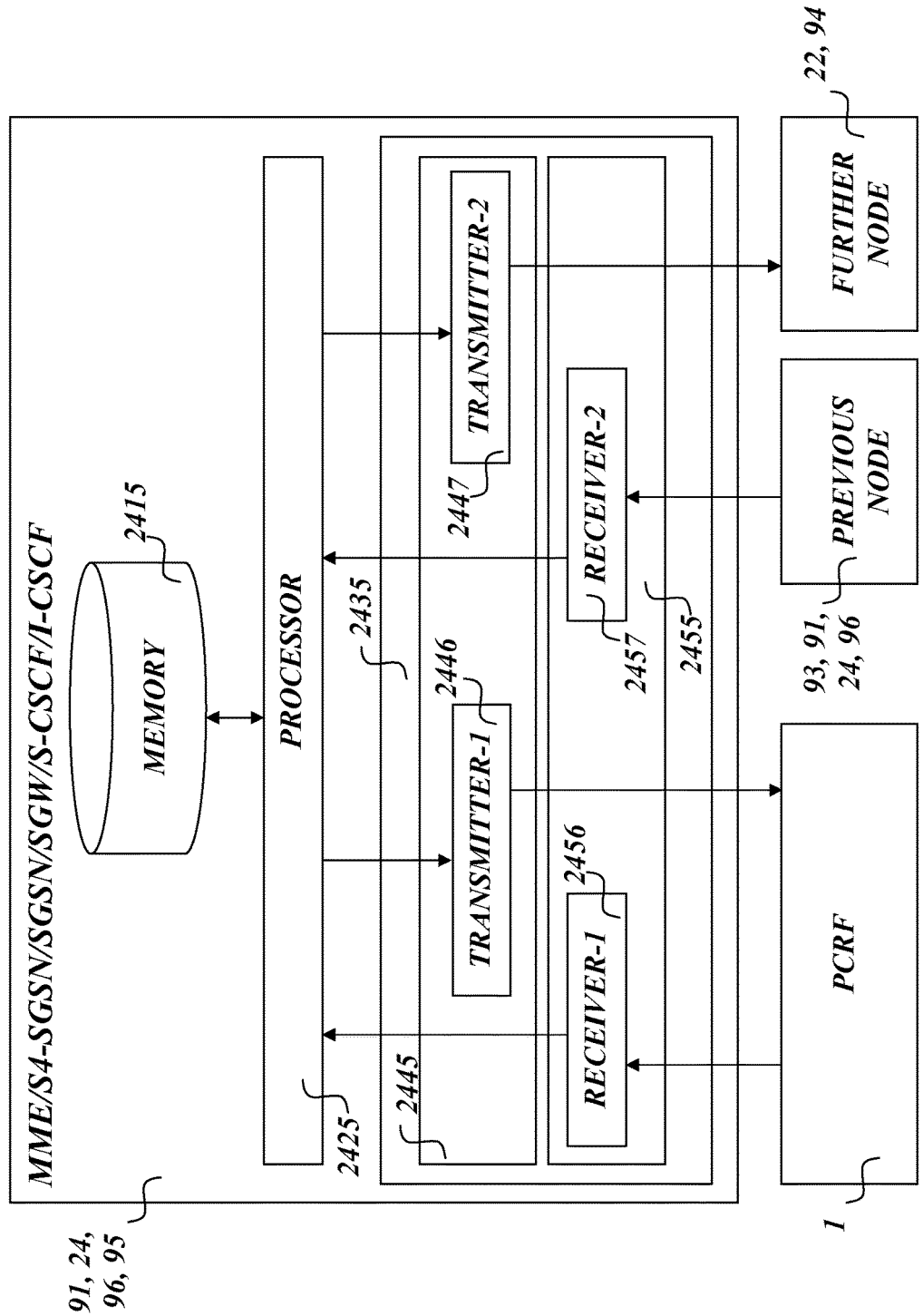
FIG. -13-

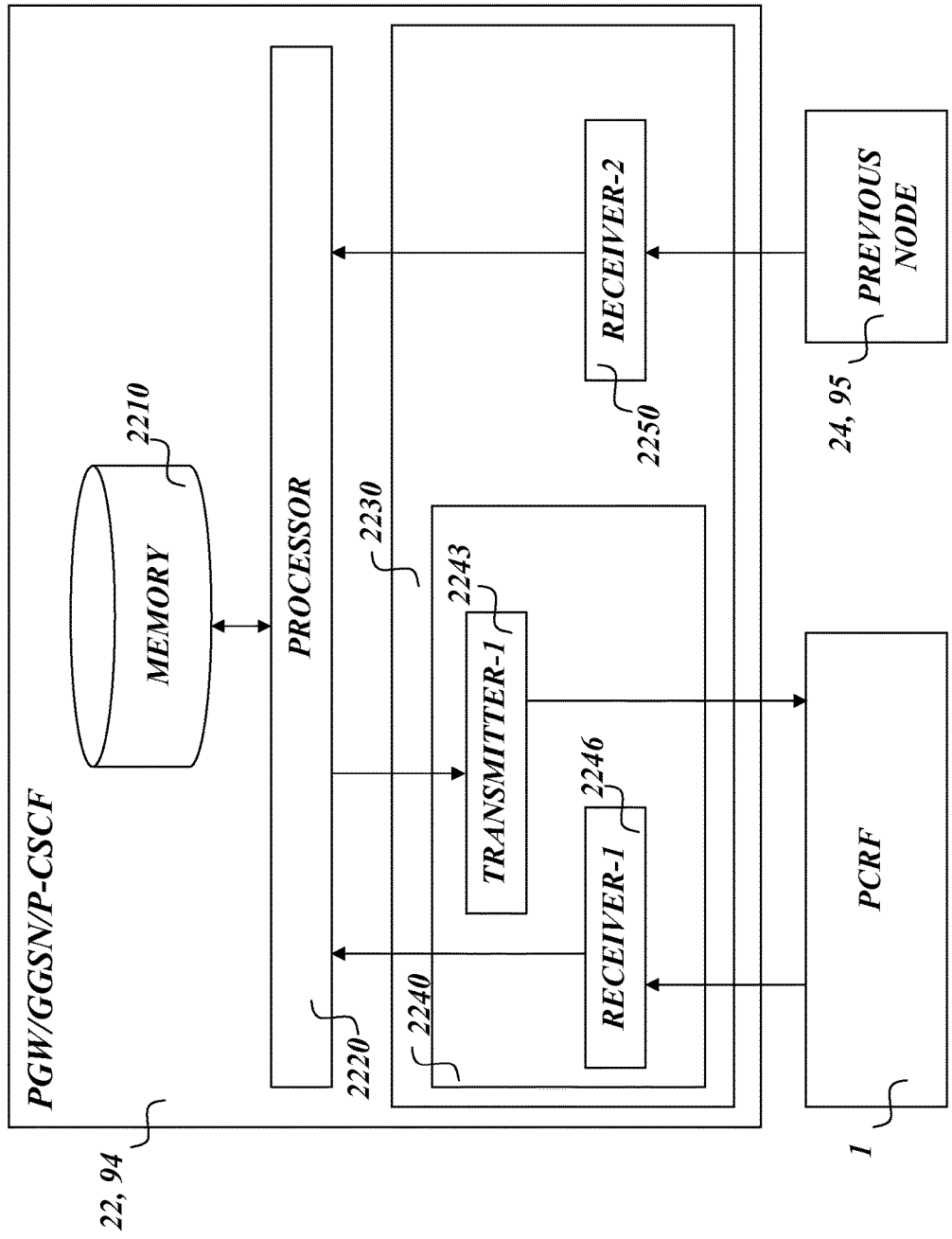
FIG. -14-

POLICY AND CHARGING RULES FUNCTION (PCRF) SELECTION

PRIORITY

This nonprovisional application is a U.S. National Stage Filing under 35 U.S.C. § 371 of International Patent Application Serial No. PCT/EP2014/064344 filed Jul. 4, 2014, and entitled "Policy And Charging Rules Function (PCRF) Selection."

TECHNICAL FIELD

The present invention generally relates to selection of a Policy and Charging Rules Function and, more specifically, the present invention relates to the selection of a Policy and Charging Rules Function by different network nodes.

BACKGROUND

Policy and Charging Control (PCC) architecture is specified in 3GPP TS 23.203 (v12.4.0), which discloses the PCC functionality for Evolved 3GPP Packet Switched domain, including both 3GPP accesses (GERAN/UTRAN/E-UTRAN) and Non-3GPP accesses. Amongst other entities, the PCC architecture illustrated in FIG. 2 comprises a Policy and Charging Rules Function (PCRF) encompassing policy control decision and flow based charging control functionalities, a Policy and Charging Enforcement Function (PCEF) encompassing service data flow detection (based on filters definitions received in PCC rules) as well as online and offline charging interactions and policy enforcement, an Application Function (AF) offering applications, in which service is delivered in a different layer from the one the service has been requested, the control of IP bearer resources according to what has been negotiated, and an Online Charging System (OCS) to allow charging decisions.

The PCRF provides network control regarding the service data flow detection, gating, quality of service (QoS) and flow based charging (except credit management) towards the PCEF. Since the PCEF is the entity handling bearers, this is where the QoS is being enforced for the bearers according to the QoS information received from the PCRF. The PCRF receives session and media related information from the AF and informs AF of traffic plane events. The AF shall communicate with the PCRF to transfer dynamic session information (i.e. description of the media to be delivered in the transport layer). This communication is performed using the Rx interface.

One example of an AF is a Proxy Call Session Control Function (P-CSCF) of an IP Multimedia Subsystem (IMS) core network. In conventional IMS procedures, the P-CSCF requests the establishment of a new Rx session with the PCRF after having completed a Registration procedure for a UE and intended to subscribe to the status of the IMS signalling path. The PCRF confirms the subscription to IMS signalling path status back to the P-CSCF.

In particular, the PCEF may be located at e.g. a gateway GPRS support node (GGSN) in a general packet radio service (GPRS) core network. The GPRS core network allows 2G, 3G and WCDMA mobile networks to transmit IP packets to external networks such as the Internet. For the cases where there is a Proxy Mobile IP (PMIP) protocol instead of a GPRS tunnelling protocol (GTP) between a Bearer Binding and Event Reporting Function (BBERF) and the PCEF, the bearer control is done in the BBERF instead. Moreover, the PCEF may also be located at e.g. a packet data network gateway (PGW) in an evolved packet system (EPS) network. The PGW, which may also be abbreviated as PDN GW, is the point of interconnect between the evolved packet core (EPC) and the external IP networks. Furthermore, the PCEF may also be located at e.g. a packet data gateway (PDG) for connecting an untrusted WLAN network with a 3GPP network. In this scenario, the PDG may be a gateway to a specific packet data network, such as the internet or an operator service network.

Apart from the conventional PCC entities discussed above, other network nodes can be connected to the PCC architecture. For example, a Mobility Management Entity (MME) responsible for tracking and paging procedures in an EPS network with E-UTRAN access, or a Serving GPRS Support Node supporting the S4 interface (S4-SGSN) for GERAN/UTRAN accesses to an EPS network. The MME is also involved in bearer activation and deactivation procedures, Serving Gateway (SGW) selection, user authentication towards the Home Subscriber Server (HSS), authorization and enforcement of User Equipment (UE) roaming restrictions and mobility between LTE and 2G/3G; and the S4-SGSN is responsible for adapting the GPRS procedures into EPS procedures, and supports a similar functionality as the MME. More specifically, the term "54-SGSN" refers to a Release-8 SGSN that has at least one set of S4/S3/S16 interfaces enabled.

In this respect, WO 2013/053896 discloses a direct interface "Sx" between an MME or an S4-SGSN and a PCRF, as illustrated in FIG. 3 of the present specification. In accordance with WO 2013/053896, during the attach procedure specified in 3GPP TS 23.401 (v12.4.0), the MME or the S4-SGSN initiates the new interface towards the PCRF and includes at least the UE Identity, PDN Identifier and APN; and the PCRF responds to the MME/S4-SGSN session request, so that the PCRF may subscribe to event notifications from the MME/S4-SGSN at this point. In particular, the Sx interface allows providing access network information to the PCRF, like for example location information, assisting the MME to select the PGW based on policies, informing the PCRF about a User Equipment Aggregate Maximum Bit Rate (UE-AMBR), and steering a UE to certain Radio access type indicating the PCRF to the MME the access type to select by the UE.

WO 2013/053896 of the same applicant discloses examples of interactions between the MME/S4-SGSN and the PCRF carried out during an Initial Attach procedure as specified in TS 23.401.

In an embodiment according to WO 2013/053896 and illustrated in FIG. 1, an attach procedure is carried out during a step S-101, as specified before step 12 in TS 23.401 (v9.8.0) with reference to FIG. 5.3.2.1-1 of TS 23.401. Then, during a step S-102, the MME/S4-SGSN initiates the new Sx interface towards the PCRF and includes at least the UE Identity, PDN Identifier and APN. The UE Identity and PDN Identifier may be used to identify the subscriber and in PCRF selection to locate the PCRF function with the corresponding IP-CAN session established by the PGW. The MME/S4-SGSN may provide additional parameters such as MME/S4-SGSN capabilities and restriction, RAN capabilities and restriction, UE capabilities and restrictions, or any other information that is available in the MME/S4-SGSN and that is relevant for this user and connection.

During a step S-103, the MME/S4-SGSN may send Create Session Request as per normal procedures; during a step S-104, the SGW may send Create Session Request as per normal procedures; and, during a step S-105, the PGW may initiate a new Gx session as per normal procedures.

The PCRF may correlate the Gx session with the Session Request from the MME/S4-SGSN and during a step S-106 the PCRF may respond to the Gx session request as per normal procedures. Then, during a step S-107, the PGW may send a Create Session Response to the SGW as per normal procedures; and during a step S-108, the SGW may send a Create Session Response to the MME/S4-SGSN as per normal procedures.

During a step S-109, the PCRF may respond to the MME/S4-SGSN session request. The PCRF may subscribe to event notifications from the MME/S4-SGSN at this point, e.g. changes to cell-id, S1-connection status or any other information that is available in the MME/S4-SGSN for this user. Eventually, during a step S-110, the attach procedure may continue as specified after step 16 in TS 23.401. Any personalized parameters provided to the MME/S4-SGSN from the PCRF are applied and used internally in the MME/S4-SGSN and in successive procedures of relevance.

At present, different PCRF clients (e.g. BBERF, PCEF, TDF, etc.) can contact the PCRF to request policy control and QoS authorization for service data flows associated with a UE. It may occur that the PCRF of the PCC architecture is contacted by certain PCRF clients even if there is no policy decision applicable by the PCRF for the UE involved. For example, a PCEF deployed in the operator network to make content filtering may unnecessarily contact the PCRF for a UE if the PCRF does not have any content filtering policy for that UE. Of course the PCRF clients cannot know in advance if certain subscriber has certain services, since they do not have any subscriber profile information so, by default, these enforcement points are configured to contact or not the PCRF, but the same criteria are taken for all the subscribers.

According to 3GPP TS 23.203, a PCRF can be contacted by any one of: BBERF by means of Gxx interface, PCEF by means of Gx interface, TDF by means of Sd interface, and AF by means of Rx interface; and, according to WO 2013/053896, the PCRF can also be contacted by MME/S4-SGSN by means of Sx interface. That is, the PCRF has to support at least the PCC interfaces: Gxx, Gx, Sd, Rx, and Sx.

When there is just one PCRF in the PCC architecture, the unnecessary signalling commented above, between PCRF clients and the PCRF, may overload the PCRF, preventing the PCRF from providing the expected policy and QoS control.

On the other hand, when there are more than one PCRF deployed in the operator network, the selection of the right PCRF by the different PCRF clients may require further resources.

3GPP TS 29.213 (v12.3.0) has defined a mechanism to select a same PCRF from different PCC interfaces that are related to the same PDN connection. This mechanism is based on the support of a Diameter Routing Agent (DRA) node in each Diameter realm so that, when the DRA first receives a request for a certain IP-CAN session, the DRA selects a suitable PCRF for the IP-CAN session and stores the PCRF address; subsequently, the DRA can retrieve the selected PCRF address according to the information carried by the incoming requests from other entities. To this end, the DRA has information about the user identity, IP address and the selected PCRF for certain PDN connection. When the IP-CAN session terminates, the DRA removes the information about the IP-CAN session.

That is, when more than one PCRF is deployed in the operator network, a DRA must also be deployed in the network in order to be in charge of selecting a same PCRF for all the nodes that need to interact with it for a same PDN connection, such as e.g. MME/S4-SGSN, BBERF, PCEF, TDF, and AF.

The DRA-based mechanism is based on the assumption that all nodes that interact with the PCRF support Diameter protocol, and that the operator deployment includes a DRA per Diameter realm.

Such a solution may imply a number of drawbacks, amongst others: the operator needs to deploy at least one additional node in the network, namely the DRA; all the PCC signalling (Sx, Gx, Gxx, Rx, . . . ) need to go via the DRA, so that any procedure can suffer delays and the DRA can be a bottleneck when congested; in roaming scenarios, there is also a need to have a DRA in the visited network (Local breakout cases) in order to find the V-PCRF, so that extra delays can be expected. In addition, 3GPP is currently studying the possibility of supporting an XML-based Rx interface on top of HTTP and, in that case, the current DRA solution would not work.

SUMMARY

The present invention is aimed to improve the prior art procedures to contact and/or to select a PCRF. Embodiments of the invention provide for a mechanism that, one the one hand, avoids unnecessarily contacting the PCRF by PCRF clients for which policy decisions cannot be made and, on the other hand, simplifies the selection of a right PCRF to be contacted by selected PCRF clients.

According to embodiments, PCC deployment information is stored in a subscriber database. This PCC deployment information identifies one or more PCC interfaces that apply for a UE and, for each of the one or more PCC interfaces, at least one node of the core network that requires contacting a PCRF node identified by a PCRF address. When the UE accesses a core network through an access network, a node of the core network requests subscriber data from the subscriber database and receives the PCC deployment information along with the subscriber data for the UE. This node of the core network may forward the PCC deployment information to a further node, and the latter may further forward the PCC deployment information to a still further node.

For the sake of comprehensibility, a node of the core network receiving the PCC deployment information from a previous node, and processing the PCC deployment information to determine whether or not to contact a PCRF, will be referred to as a current node of reference hereinafter. This current node may forward the received PCC deployment information to a further node if the current node is an intermediate node, and not a final node, in a chain of nodes that receive the PCC deployment information, in accordance with particular procedures of each core and access networks involved. In other words, when the current node is an intermediate node, the current node will forward the PCC deployment information to a further node; whereas, when the current node is a final node, the current node will not forward the PCC deployment information to any further node. The previous node submitting the PCC deployment information to the current node may be the subscriber database or a previous intermediate node which forwarded the PCC deployment information.

The current node receiving the PCC deployment information may thus determine, firstly, whether or not the current node will contact a PCRF and, secondly, if a PCRF must be contacted, the PCRF node to be contacted. In an embodiment, where there are more than one PCRF node, the current node may thus determine the PCRF to be contacted amongst the plurality of PCRF nodes.

Thus, in accordance with a first aspect of the present invention, there is provided a method, at a current node of a core network, of selecting a PCRF node of a PCC architecture, which comprises one or more PCRF nodes, to be selectively contacted by one or more nodes of a core network. This current node of the core network being considered a node of reference where the method is carried out.

This method is carried out at a current node of the core network and comprises receiving PCC deployment information from a previous node of the core network, wherein the PCC deployment information identifies one or more PCC interfaces that apply for a UE and, for each of the one or more PCC interfaces, at least one node of the core network that requires to contact a PCRF node identified by a PCRF address. This method also comprises determining at the current node whether a PCRF node has to be contacted, based on the received PCC deployment information; and, if it is determined that the PCRF node has to be contacted, the method also comprises initiating a session from the current node with the PCRF node identified by a corresponding PCRF address. The current node carrying out this method may be an intermediate node or a final node.

In particular, determining a PCRF node to be contacted by the current node may comprise identifying a PCC interface in the PCC deployment information that the current node supports and, for that PCC interface, identifying the current node amongst the at least one node of the core network that requires to contact a PCRF node identified by a PCRF address.

In a first embodiment applicable when the current node carrying out this method is an intermediate node, the method may further comprise forwarding the PCC deployment information from the current node to a further node of the core network.

Two cases appear under this first embodiment. In a first case, the previous node of the core network may be a subscriber database holding subscriber data applicable for the UE, and the current node may receive the PCC deployment information when the UE accesses the core network through an access network.

Different sub-embodiments for this first case are provided for under this first embodiment when this method is applied in different scenarios. In a first sub-embodiment, the subscriber database may be a HSS, the access network may be an LTE network, the current node may be an MME, and the further node may be a SGW. In a second sub-embodiment, the subscriber database may be a HSS, the access network may be a GERAN/UTRAN network, the current node may be an S4-SGSN, and the further node may be a SGW. In a third sub-embodiment, the subscriber database may be a HSS, the access network may be a GERAN/UTRAN network connected to a GPRS network, the current node may be an SGSN, and the further node may be a GGSN. In a fourth sub-embodiment, the subscriber database may be a HSS, the core network may be an IMS core network, the current node may be an S-CSCF node, and the further node may be an I-CSCF node. The exemplary HSS holds subscriber data for a subscriber and thus applicable for a UE that the subscriber is using. The exemplary S-CSCF is the entity of the IMS core network that has been assigned for serving the UE, and the I-CSCF is the entity of the IMS core network that had assigned the S-CSCF for serving the UE.

In a second case under the above first embodiment, the previous node of the core network may be a node that receives the PCC deployment information from a subscriber database when the UE accesses the core network through an access network.

Also different sub-embodiments for this second case are provided for under this first embodiment when this method is applied in different scenarios. In a first sub-embodiment, the subscriber database may be a HSS, the access network may be an LTE network, the previous node may be an MME, the current node may be an SGW, and the further node may be one of a PGW and a PCRF node. In a second sub-embodiment, the subscriber database may be a HSS, the access network may be a GERAN/UTRAN network, the previous node may be an S4-SGSN, the current node may be an SGW, and the further node may be one of a PGW and a PCRF node. In a third sub-embodiment, the subscriber database may be a HSS, the core network may be an IMS core network, the previous node may be an S-CSCF node, the current node may be an I-CSCF node, and the further node may be a P-CSCF node.

In a second embodiment applicable when the current node carrying out this method is a final node, i.e. the current node does not forward the PCC deployment information to any further node, different sub-embodiments are provided for when this method is applied in different scenarios. In a first sub-embodiment, the previous node of the core network may be a SGW and the current node may be a PGW. In a second sub-embodiment, the previous node of the core network may be a PCRF node and the current node may be a PGW. In a third sub-embodiment, the previous node of the core network may be an SGSN and the current node may be a GGSN. In a fourth sub-embodiment, the previous node of the core network may be an I-CSCF node and the current node may be a P-CSCF node.

Further advantageous embodiments are also provided for, which may be combined with any one of the above first and second embodiments, in this method. For instance, the PCC deployment information stored in the subscriber database may further include an applicability indicator to be used by the subscriber database in identifying relevant data for applicable scenarios. Also for instance, the PCC deployment information may further indicate an operation that triggers contact with the PCRF node and, when this is the case, initiating the session towards the PCRF node may further be carried out upon handling the operation that triggers the contact with the PCRF node.

In accordance with a second aspect of the present invention, there is provided a method, at a subscriber database, of selecting a PCRF node of a PCC architecture, which comprises one or more PCRF nodes, to be selectively contacted by one or more nodes of a core network.

This method is carried out at a subscriber database and comprises, upon a UE accessing the core network, receiving at the subscriber database from a node of the core network a request for subscriber data applicable for the UE; determining, at the subscriber database, PCC deployment information and subscriber data to be provided to the node of the core network, wherein the PCC deployment information identifies one or more PCC interfaces that apply for the UE and, for each of the one or more PCC interfaces, at least one node of the core network that requires to contact a PCRF node identified by a PCRF address; and sending the PCC deployment information and the subscriber data from the subscriber database to the node of the core network.

In accordance with a third aspect of the present invention, there is provided a node of a core network, hereinafter referred to as current node and configured to interact with a PCRF node of a PCC architecture, which comprises one or more PCRF nodes for controlling communications of a UE in the core network.

In an embodiment, this current node comprises at least one processor, and at least one memory that stores processor-executable instructions, wherein the at least one processor interfaces with the at least one memory to execute the processor-executable instructions, whereby said current node is operable to: receive, from a previous node of the core network, PCC deployment information identifying one or more PCC interfaces that apply for the UE and, for each of the one or more PCC interfaces, at least one node of the core network that requires to contact a PCRF node identified by a PCRF address; determine whether a PCRF node has to be contacted, based on the PCC deployment information; and, if it is determined that the PCRF node has to be contacted, initiate a session with the PCRF node identified by the corresponding PCRF address.

Particularly in determining the PCRF node to be contacted, the current node may further be operable to identify a PCC interface in the PCC deployment information that the current node supports and, for that PCC interface, to identify the current node amongst the at least one node of the core network that requires to contact a PCRF node identified by a PCRF address.

In a first embodiment applicable when the current node is an intermediate node, the current node may further be operable to forward the PCC deployment information to a further node of the core network.

Two cases appear under this first embodiment. In a first case, the previous node of the core network may be a subscriber database holding subscriber data applicable for the UE, and the current node may further be operable to receive the PCC deployment information when the UE accesses the core network through an access network.

Different sub-embodiments for this first case are provided for under this first embodiment when the current node is used in different scenarios. In a first sub-embodiment, the subscriber database may be a HSS, the access network may be an LTE network, the current node may be an MME, and the further node may be a SGW. In a second sub-embodiment, the subscriber database may be a HSS, the access network may be a GERAN/UTRAN network, the current node may be an S4-SGSN, and the further node may be a SGW. In a third sub-embodiment, the subscriber database may be a HSS, the access network may be a GERAN/UTRAN network connected to a GPRS network, the current node may be an SGSN, and the further node may be a GGSN. In a fourth sub-embodiment, the subscriber database may be a HSS, the core network may be an IMS core network, the current node may be an S-CSCF node, and the further node may be an I-CSCF node.

In a second case under the above first embodiment, the previous node of the core network may be a node that receives the PCC deployment information from a subscriber database when the UE accesses the core network through an access network.

Also different sub-embodiments for this second case are provided for under this first embodiment when the current node is used in different scenarios. In a first sub-embodiment, the subscriber database may be a HSS, the access network may be an LTE network, the previous node may be an MME, the current node may be an SGW, and the further node may be one of a PGW and a PCRF node. In a second sub-embodiment, the subscriber database may be a HSS, the access network may be a GERAN/UTRAN network, the previous node may be an S4-SGSN, the current node may be an SGW, and the further node may be one of a PGW and a PCRF node. In a third sub-embodiment, the subscriber database may be a HSS, the core network may be an IMS core network, the previous node may be an S-CSCF node, the current node may be an I-CSCF node, and the further node may be a P-CSCF node.

In a second embodiment applicable when the current node carrying out this method is a final node, i.e. the current node does not forward the PCC deployment information to any further node, different sub-embodiments are provided for when the current node is used in different scenarios. In a first sub-embodiment, the previous node of the core network may be a SGW and the current node may be a PGW. In a second sub-embodiment, the previous node of the core network may be a PCRF node and the current node may be a PGW. In a third sub-embodiment, the previous node of the core network may be an SGSN and the current node may be a GGSN. In a fourth sub-embodiment, the previous node of the core network may be an I-CSCF node and the current node may be a P-CSCF node.

Further advantageous embodiments are also provided for, which may be combined with any one of the above first and second embodiments, in this current node. For instance, the PCC deployment information may further indicate an operation that triggers contact with the PCRF node and, when this is the case, the current node may further be operable to initiate the session towards the PCRF node upon handling the operation that triggers the contact with the PCRF node.

In accordance with a fourth aspect of the present invention, there is provided a subscriber database for holding subscriber data applicable for a UE to access a core network and for allowing a node of the core network to select a PCRF node of a PCC architecture, which comprises one or more PCRF nodes.

In an embodiment, this subscriber database comprises at least one processor, and at least one memory that stores processor-executable instructions, wherein the at least one processor interfaces with the at least one memory to execute the processor-executable instructions, whereby said subscriber database is operable to: receive, from a node of the core network, a request for subscriber data applicable for the UE; determine PCC deployment information and subscriber data to be provided to the node of the core network, wherein the PCC deployment information identifies one or more PCC interfaces that apply for the UE and, for each of the one or more PCC interfaces, at least one node of the core network that requires to contact a PCRF node identified by a PCRF address; and send, to the node of the core network, the PCC deployment information and the subscriber data.

Aligned with advantageous embodiments discussed above for the method carried out at the subscriber database, the PCC deployment information may further include an applicability indicator to be used by the subscriber database in identifying relevant data for applicable scenarios, and/or the PCC deployment information may further indicate an operation that triggers contact with the PCRF node.

In particular, this subscriber database may further be operable to act as a HSS.

BRIEF DESCRIPTION OF THE DRAWINGS

The features, objects and advantages of the invention will become apparent by reading this description in conjunction with the accompanying drawings, in which:

FIG. 1 shows an exemplary sequence of actions carried out to establish a session between an MME/S4-SGSN and a PCRF during attach of a UE with a core network, according to the prior art.

FIG. 2 basically represents entities and interfaces of a PCC architecture in accordance with 3GPP TS 23.203, wherein some entities and interfaces are adapted in accordance with the invention.

FIG. 3 shows an exemplary chain of nodes communicating with a PCRF and respective communication interfaces, wherein the nodes and interfaces are adapted in accordance with the invention.

FIG. 4 shows an exemplary sequence of actions carried out by a node of the core network to obtain PCC deployment information from a subscriber database in accordance with a first embodiment of the invention.

FIG. 5 illustrates an exemplary sequence of actions carried out by nodes of the core network in accordance with a second embodiment of the invention, whereby different nodes receive PCC deployment information from a previous node, determine whether or not initiating a session with the PCRF based on the PCC deployment information and, in some cases, forward the PCC deployment information to a further node.

FIG. 6 illustrates an exemplary sequence of actions carried out by nodes of the core network in accordance with a third embodiment of the invention, whereby different nodes receive PCC deployment information from a previous node, determine whether or not initiating a session with the PCRF based on the PCC deployment information and, in some cases, forward the PCC deployment information to a further node.

FIG. 7 illustrates an exemplary sequence of actions carried out by nodes of the core network in accordance with a fourth embodiment of the invention, whereby different nodes receive PCC deployment information from a previous node, determine whether or not initiating a session with the PCRF based on the PCC deployment information and, in some cases, forward the PCC deployment information to a further node.

FIG. 8 shows a basic sequence of actions carried out between a subscriber data base and an intermediate node for the latter to obtain PCC deployment information from the former and to be forwarded towards a further node.

FIG. 9 shows a basic sequence of actions carried out at an intermediate node and at a final node, wherein both obtain PCC deployment information from a previous node, and wherein the intermediate node forwards the PCC deployment information towards a further node.

FIG. 10 shows, in accordance with an embodiment, a basic component structure of a subscriber database, e.g. HSS, and a basic component structure of an intermediate node which receives the PCC deployment info from the subscriber database, and forwards the PCC deployment info towards a further node.

FIG. 11 shows, in accordance with an embodiment, a basic component structure of an intermediate node which receives the PCC deployment info from a previous node and forwards the PCC deployment info towards a further node, and a basic component structure of a final node which receives the PCC deployment info from an intermediate node.

FIG. 12 shows, in accordance with a further embodiment, a basic component structure of an exemplary subscriber database, i.e. HSS.

FIG. 13 shows, in accordance with a further embodiment, a basic component structure of an exemplary intermediate node which receives the PCC deployment info from a previous node, such as the subscriber database or other intermediate node, and forwards the PCC deployment info towards a further node.

FIG. 14 shows, in accordance with a further embodiment, a basic component structure of an exemplary final node which receives the PCC deployment info from a previous node, such as the subscriber database or an intermediate node, and which does not forward the PCC deployment info towards any further node.

DETAILED DESCRIPTION

The following describes currently preferred embodiments of network nodes and methods of contacting and/or selecting a PCRF node of a PCC architecture, which comprises one or more PCRF nodes, to be selectively contacted by one or more nodes of a core network. A general view of these methods is disclosed with reference to FIG. 8 and FIG. 9.

FIG. 8 illustrates a method according to an embodiment of the invention whereby a node of a core network, such as e.g. an MME, S4-SGSN and S-CSCF, may obtain the PCC deployment information from a subscriber database, like e.g. a HSS.

As FIG. 8 illustrates, in this method there is a step S-800, at the node of the core network, of requesting subscriber data for a UE which accesses the core network.

At the subscriber database, there is a corresponding step S-810 of receiving the subscriber data request for the UE; there is a step S-820 of determining the subscriber data and PCC deployment information for the UE, wherein the PCC deployment information identifies one or more PCC interfaces that apply for the UE and, for each of the one or more PCC interfaces, at least one node of the core network that requires to contact a PCRF node identified by a PCRF address; and there is a step S-830 of sending the PCC deployment information and the subscriber data from the subscriber database to the node of the core network.

At the node of the core network, there is a corresponding step S-840 of receiving the subscriber data and PCC deployment information for the UE; and there is a step S-850 of forwarding the PCC deployment information to a further node.

FIG. 9 illustrates a method according to an embodiment of the invention whereby an intermediate node of a core network, such as e.g. an MME, S4-SGSN, SGSN, SGW, S-CSCF and I-CSCF, and a final node of a core network, such as e.g. a PGW, GGSN and P-CSCF, may obtain the PCC deployment information from a previous node and may take respective proper actions based on the PCC deployment information. In this respect, an intermediate node of the core network is a node that will forward the PCC deployment information towards a further node of the core network, whereas a final node of the core network is a node that will not forward the PCC deployment information towards any further node.

As FIG. 9 illustrates, this method comprises at the intermediate node of the core network a step S-900 of receiving PCC deployment information from a previous node; a step S-910 of determining whether a PCRF node has to be contacted, based on the PCC deployment information; a step S-920, which applies if it is determined that the PCRF has to be contacted, of initiating a session with the PCRF identified by a corresponding PCRF address in the PCC deployment information; and a step S-930 of forwarding the PCC deployment information to a further node.

As FIG. 9 illustrates, this method comprises at the final node of the core network a step S-940 of receiving PCC deployment information from a previous node; a step S-950 of determining whether a PCRF node has to be contacted, based on the PCC deployment information; and a step S-960, which applies if it is determined that the PCRF has to be contacted, of initiating a session with the PCRF identified by a corresponding PCRF address in the PCC deployment information.

In particular, nothing in this specification prevents for any one of the exemplary cited intermediate nodes above, e.g. MME, S4-SGSN, SGSN, SGW, being a final node which does not forward the PCC deployment information towards any further node.

Complementary with the general view of the methods discussed above with reference to FIG. 8 and FIG. 9, a general view of the corresponding networks nodes is disclosed with reference to FIG. 10 and FIG. 11 in the following.

FIG. 10 illustrates a node of a core network, such as e.g. an MME, S4-SGSN and S-CSCF, operable to obtain PCC deployment information from a subscriber database, like e.g. a HSS, when a UE accesses the core network; and FIG. 10 also illustrates the exemplary HSS.

As FIG. 10 illustrates, the exemplary HSS 93 comprises at least one processor 931 and at least one memory 932 that stores processor-executable instructions 930. The at least one processor interfaces with the at least one memory to execute the processor-executable instructions, so that the HSS is operable to: receive 934, from a node of the core network, a request for subscriber data applicable for the UE; determine 936 PCC deployment information and subscriber data to be provided to the node of the core network, wherein the PCC deployment information identifies one or more PCC interfaces, such as e.g. Sx, Gx and Rx, that apply for the UE and, for each of the one or more PCC interfaces, at least one node of the core network, such as e.g. MME, PCEF and P-CSCF, that requires to contact a PCRF node identified by a PCRF address; and send 938, to the node of the core network, the PCC deployment information and the subscriber data.

As FIG. 10 illustrates, the exemplary MME/S4-SGSN 91 and S-CSCF 96 comprise at least one processor 911 and at least one memory 912 that stores processor-executable instructions 910. The at least one processor interfaces with the at least one memory to execute the processor-executable instructions, so that the MME/S4-SGSN and S-CSCF are operable to: request 914 subscriber data for a UE accessing a core network; receive 915 subscriber data and PCC deployment information; determine 917 whether a PCRF node has to be contacted, based on the PCC deployment information; if it is determined that the PCRF node has to be contacted, initiate 918 a session with the PCRF node identified by a corresponding PCRF address; and forward 919 the PCC deployment information to a further node.

FIG. 11 illustrates an intermediate node of a core network, which receives PCC deployment information from a previous node of the core network, operates based on the received PCC deployment information, and forwards the PCC deployment information to a further node; and FIG. 11 also illustrates a final node of the core network, which receives PCC deployment information from a previous node of the core network, operates based on the received PCC deployment information, and does not forward the PCC deployment information to any further node. The intermediate node illustrated in FIG. 11 may be any one of e.g. an MME/S4-SGSN 91, SGSN, SGW 24, S-CSCF 96 and I-CSCF 95; whereas the final node illustrated in FIG. 11 may be any one of e.g. a PGW 22, GGSN and P-CSCF 94.

In particular and not illustrated in any drawing, a final node of the core network may also be any one of the exemplary MME/S4-SGSN/SGSN/SGW nodes provided that, based on the PCC deployment information or on internal configuration, such exemplary nodes do not forward the received PCC deployment information to any further node.

As FIG. 11 illustrates, the exemplary intermediate nodes MME/S4-SGSN 91, SGSN, SGW 24, S-CSCF 96 and I-CSCF 95 comprise at least one processor 241 and at least one memory 242 that stores processor-executable instructions 240. The at least one processor interfaces with the at least one memory to execute the processor-executable instructions, so that the MME/S4-SGSN, SGSN, SGW, S-CSCF and I-CSCF are operable to: receive 244 PCC deployment information from a previous node; determine 246 whether a PCRF node has to be contacted, based on the PCC deployment information; if it is determined that the PCRF node has to be contacted, initiate 247 a session with the PCRF node identified by a corresponding PCRF address; and forward 248 the PCC deployment information to a further node.

As FIG. 11 illustrates, the exemplary final nodes PGW 22, GGSN and P-CSCF 94, as well as others not illustrated, comprise at least one processor 221 and at least one memory 222 that stores processor-executable instructions 220. The at least one processor interfaces with the at least one memory to execute the processor-executable instructions, so that the PGW, GGSN and P-CSCF are operable to: receive 224 PCC deployment information from a previous node; determine 226 whether a PCRF node has to be contacted, based on the PCC deployment information; and, if it is determined that the PCRF node has to be contacted, initiate 228 a session with the PCRF node identified by a corresponding PCRF address.

Apart from the general view of these methods and networks nodes disclosed above with reference to FIG. 8, FIG. 9, FIG. 10 and FIG. 11, the present specification further provides for specific embodiments applicable for different scenarios where the invention may be applied.

Prior to discussing these specific embodiments, it is worthwhile to discuss an exemplary PCC deployment information as shown in the Table 1 that follows:

TABLE 1

| Node | Reference Point | Support | PCRF Address | Additional data | Applicability |
|---|---|---|---|---|---|
| MME | Sx | Yes/No | aa.bb.cc.dd | | EPC |
| S4-SGSN | Sx | Yes/No | aa.bb.cc.dd | | EPC |
| SGSN | Sx | Yes/No | bb.cc.dd.ee | | GPRS |
| AGW | Gxx | Yes/No | aa.bb.cc.dd | PGW Address | EPC |
| PCEF | Gx | Yes/No | aa.bb.cc.dd | | All |
| Secondary-PCEF | Gx | Yes/No | cc.dd.ee.ff | | All (non-standard) |
| P-CSCF | Rx | Yes/No | aa.bb.cc.dd | | IMS |
| ... | ... | ... | ... | ... | ... |

In this exemplary PCC deployment information, the PCRF Address may vary in different reference points, i.e. PCC interfaces, depending on the scenario. The "Applicability" field may be used internally at a subscriber database, e.g. the HSS, in order to provide only the data relevant for the applicable scenario. The PCC deployment information may be sent to a node of the core network, e.g. the MME/S4-SGSN/SGSN/S-CSCF, during the access of a UE to the core network.

The PCC deployment info is filled based on whether the operator has specific policies that are handled over those PCC interfaces or reference points. For example, if for certain UE there are no location-based policies or there are no policies related to PGW selection, the MME might not need to contact the PCRF.

Likewise, if the PCRF is only used in order to provide policy control over certain functionality such as e.g. content filtering, the Gxx (PMIP cases) and Gx (GTP and PMIP cases) interfaces would not be required for those UE that do not support that functionality.

Once the exemplary contents of the PCC deployment information have been discussed, the specific embodiments applicable for different scenarios can now be explained in more detail.

FIG. 4 illustrates an embodiment of the invention whereby a node of the core network obtains PCC deployment information from a subscriber database during retrieval of subscriber data for a UE attaching the core network through an access network. In particular, if the access network is an LTE network, the subscriber database is a HSS and the node obtaining the PCC deployment information is an MME; if the access network is a GERAN/UTRAN network, the subscriber database is a HSS and the node obtaining the PCC deployment information is an S4-SGSN; if the access network is a GERAN/UTRAN network connected to a GPRS network, the subscriber database is a HLR and the node obtaining the PCC deployment information is an SGSN.

For the sake of simplicity, and taking into account the similarity of procedures, both MME and S4-SGSN nodes are compactly referred to as an MME/S4-SGSN node 91 hereinafter and irrespective of being one individual MME or S4-SGSN node, or a combination of both nodes.

As illustrated in FIG. 4, upon a UE accessing the network during a step S-400, the MME/S4-SGSN 91 requests subscriber data to a HSS 93 during a step S-405. The HSS 93 determines during a step S-410 the subscriber data and PCC deployment information for the UE, and sends during a step S-415 the subscriber data and the PCC deployment information for the UE to the MME/S4-SGSN 91.

In accordance with the naming principles discussed above, the MME/S4-SGSN 91 receiving the PCC deployment information during the step S-415 illustrated in FIG. 4 may be considered a current node of reference that further takes appropriate actions based on the received PCC deployment information.

Embodiments showing the further appropriate actions to be taken at the MME/S4-SGSN 91 based on the received PCC deployment information are illustrated in FIG. 5 and FIG. 6.

A first embodiment showing the further appropriate actions to be taken by the MME/S4-SGSN 91 is illustrated in FIG. 5, after having received the PCC deployment information as illustrated in FIG. 4. This embodiment illustrated in FIG. 5 corresponds to a deployment where GTP is supported over S5/S8 interface. In this example, policy control is required over both Sx and Gx interfaces.

As FIG. 5 illustrates, the MME/S4-SGSN 91, which had previously received the PCC deployment information from the HSS, determines during a step S-500 a PCRF to be contacted, based on whether the received PCC deployment information includes the MME/S4-SGSN for the PCC interface Sx. For example, in the Table 1 above, the MME/S4-SGSN may find:

| MME | Sx | Yes | aa.bb.cc.dd |
| S4-SGSN | Sx | Yes | aa.bb.cc.dd |

The MME/S4-SGSN reads its name for the PCC interface Sx in the received PCC deployment information, and finds the PCRF address aa.bb.cc.dd identifying the PCRF node to be contacted.

Then, the MME/S4-SGSN 91 establishes an Sx session with the PCRF node 1 during steps S-505 and S-510.

At this stage, the MME/S4-SGSN 91 had received the PCC deployment information from a previous node, namely from the HSS 93 during the step S-415, and may thus be considered the current node determining that a PCRF node has to be contacted, based on the PCC deployment information, and initiating a session with the PCRF node identified by a corresponding PCRF address.

Still with reference to FIG. 5, the MME/S4-SGSN 91 sends a request to create a session to a SGW node 24 during a step S-515, as a GTP message, wherein the request includes the PCC deployment information received from the previous node. That is, the MME/S4-SGSN 91 as current node forwards the received PCC deployment information to a further node, in this case, the SGW node 24.

The SGW node 24 receives the PCC deployment information during the step S-515 and, as current node of reference, the SGW reads the data related to an Access Gateway (AGW) in the PCC deployment information. In this respect, the SGW may be considered the AGW in the 3GPP access case. For example, in the Table 1 above, the SGW may find:

| AGW | Gxx | No | — | PGW Address |

Based on that portion of the PCC deployment information, the SGW determines that it does not need to initiate any interaction with a PCRF node, but rather forwarding the received message towards a PGW node identified by the PGW address included in the PCC deployment information. Then, the SGW node 24 forwards the GTP message to a PGW node 22 during a step S-520, the GTP message being the request to create a session and including the received PCC deployment information.

At this stage, the SGW node 24 had received the PCC deployment information from a previous node, namely from the MME/S4-SGSN 91 during the step S-515, and may thus be considered the current node determining, based on the PCC deployment information, that a PCRF node will not be contacted and, without initiating a session with any PCRF node, the SGW node 24 as current node forwards the PCC deployment information towards a further node, namely the PGW node 22.

The PGW node 22 receives the PCC deployment information during the step S-520 and, as current node of reference, the PGW reads the data related to PCEF in the PCC deployment information. For example, in the Table 1 above, the PGW may find:

| PCEF | Gx | Yes | aa.bb.cc.dd |

Based on that portion of the PCC deployment information and where the PGW includes the PCEF functionality, the PGW determines during a step S-525 that it has to initiate a Gx session with a PCRF node identified by the PCRF address aa.bb.cc.dd.

To this end, the PGW node 22 establishes a Gx session with the PCRF node 1 during steps S-530 and S-535.

At this stage, the PGW node 22 had received the PCC deployment information from a previous node, namely from the SGW node 24 during the step S-520, and may thus be considered the current node determining that a PCRF node has to be contacted, based on the PCC deployment information, and initiating a session with the PCRF node identified by a corresponding PCRF address. The PGW node 22 may be considered a final node in the chain so that it will not forward the PCC deployment information to any further node.

Still with reference to FIG. 5, the method in this first embodiment is completed by acknowledging the session created from the PGW node 22 to the SGW 24, and from the SGW 24 to the MME/S4-SGSN 91 during respective steps S-540 and S-545.

In this chain of network nodes (MME/S4-SGSN 91, SGW 24 and PGW 22) only the MME/S4-SGSN 91 and the PGW 22 have contacted a particular PCRF node of one or more PCRF nodes, whereas the SGW node 24 has not contacted any PCRF, likely, because there are no policies established by the operator to be applied by the PCRF for the SGW.

A second embodiment showing the further appropriate actions to be taken by the MME/S4-SGSN 91 is illustrated in FIG. 6, after having received the PCC deployment information as illustrated in FIG. 4. This embodiment illustrated in FIG. 6 corresponds to a deployment where PMIP is supported over S5/S8 interface. In this example, policy control is required over both Sx and Gxx/Gx interfaces.

As FIG. 6 illustrates, the MME/S4-SGSN 91, which had previously received the PCC deployment information from the HSS, determines during a step S-600 a PCRF to be contacted, based on whether the received PCC deployment information includes the MME/S4-SGSN for the PCC interface Sx. For example, in the Table 1 above, the MME/S4-SGSN may find:

| MME | Sx | Yes | aa.bb.cc.dd |
| S4-SGSN | Sx | Yes | aa.bb.cc.dd |

The MME/S4-SGSN reads its name for the PCC interface Sx in the received PCC deployment information, and finds the PCRF address aa.bb.cc.dd identifying the PCRF node to be contacted.

Then, the MME/S4-SGSN 91 establishes an Sx session with the PCRF node 1 during steps S-605 and S-610.

At this stage, the MME/S4-SGSN 91 had received the PCC deployment information from a previous node, namely from the HSS 93 during the step S-415, and may thus be considered the current node determining that a PCRF node has to be contacted, based on the PCC deployment information, and initiating a session with the PCRF node identified by a corresponding PCRF address.

Still with reference to FIG. 6, the MME/S4-SGSN 91 sends a request to create a session to a SGW node 24 during a step S-615 as a GTP message, wherein the request includes the PCC deployment information. That is, the MME/S4-SGSN 91, as current node, forwards the received PCC deployment information to a further node, in this case, the SGW node 24.

The SGW node 24 receives the PCC deployment information during the step S-615 and, as current node of reference, the SGW reads the data related to AGW (SGW is the AGW in the 3GPP access case) in the PCC deployment information. For example, in the Table 1 above, the SGW may find:

| AGW | Gxx | Yes | aa.bb.cc.dd | PGW Address |

Based on that portion of the PCC deployment information, the SGW determines during a step S-620 that it has to initiate a gateway session establishment procedure over Gxx to a PCRF node identified by the PCRF address provided on that portion of the PCC deployment information. To this end, the SGW 24 submits during a step S-625 a gateway Gxx session request to the PCRF node 1, wherein the Gxx session request includes the PGW address to be contacted and the received PCC deployment information. That is, the SGW 24 forwards the PCC deployment information to a further node which in this case is the PCRF node.

At this stage, the SGW node 24 had received the PCC deployment information from a previous node, namely from the MME/S4-SGSN 91 during the step S-615, and may thus be considered the current node determining, based on the PCC deployment information, a PCRF node to be contacted and initiating a session with said PCRF node; besides, the SGW node 24, as current node, forwards the PCC deployment information towards a further node, namely the PCRF node 1.

The PCRF node 1 receives the PCC deployment information during the step S-625 and, as current node of reference, the PCRF determines based on the PCC deployment information and on the received PGW address that it has to initiate a session with a PGW (which includes the PCEF functionality). To this end, the PCRF node 1 initiates a Gx session trigger establishment request towards a PGW node 22 during a step S-630, wherein this request includes the received PCC deployment information and may also include the own PCRF address and additional data (e.g. access information).

In addition under this embodiment, the PCRF node 1 acknowledges the session establishment towards the SGW node 24 during a step S-635. Then, the SGW node 24 initiates a Proxy Binding Update procedure towards the PGW node 22 during a step S-640.

The PGW node 22 receives the PCC deployment information during the step S-630 and the binding update during the step S-640. These messages could be received in any sequence, and the PGW simply waits for both messages and, once both messages are received and linked, allocates an IP address for the UE. As a current node of reference, the PGW may read the data related to PCEF in the PCC deployment information. For example, in the Table 1 above, the PGW may find:

| PCEF | Gx | Yes | aa.bb.cc.dd |

Based on that portion of the PCC deployment information and where the PGW includes the PCEF functionality, the PGW determines that it has to initiate a Gx session with a PCRF node identified by the PCRF address aa.bb.cc.dd.

To this end, the PGW node 22 establishes a Gx session with the PCRF node 1 during steps S-645 and S-650.

At this stage, the PGW node 22 had received the PCC deployment information from a previous node, namely from the PCRF node 1 during the step S-630, and may thus be considered the current node determining that a PCRF node has to be contacted, based on the PCC deployment information, and initiating a session with the PCRF node identified by a corresponding PCRF address. The PGW node 22 may be considered a final node in the chain so that it will not forward the PCC deployment information to any further node.

Still with reference to FIG. 6, the method in this second embodiment is completed by acknowledging the session created from the PCRF node 1 to the PGW node 22, from the PGW node 22 to the SGW 24, and from the SGW 24 to the MME/S4-SGSN 91 during respective steps S-650, S-655 and S-660.

In this chain of network nodes, all MME/S4-SGSN 91, SGW 24 and PGW 22 have contacted a particular PCRF node of one or more PCRF nodes, based on the received PCC deployment information.

A further exemplary scenario where the invention may be applied is an IMS core network. In this respect, the AF is also a PCRF client and, in the case of an IMS core network, the P-CSCF behaves as an AF and is thus a PCRF client.

A third embodiment for this further exemplary scenario is illustrated in FIG. 7, wherein a UE accesses the IMS core network with a registration procedure. The embodiment illustrated in FIG. 7 thus includes actions to be carried out upon a UE accessing the core network, as for the scenario illustrated in FIG. 4, and also includes further actions taken by other nodes, as for the scenarios illustrated in FIG. 5 and FIG. 6.

As FIG. 7 illustrates, a UE 90 access the IMS core network by submitting a Register message during a step S-700 towards a P-CSCF node 94.

Following a conventional IMS Registration procedure, the P-CSCF forwards the Register message during a step S-705 towards an I-CSCF node 95. The I-CSCF interrogates a HSS 93 during a step S-710 in order to obtain an identifier of an S-CSCF already assigned for the UE, or capabilities that a selectable S-CSCF should have for serving the UE. The HSS provides such information during a step S-715 to the I-CSCF and the latter determines an S-CSCF for serving the user. Then, the I-CSCF forwards the Register message during a step S-720 to the corresponding S-CSCF node 96.

Upon receipt of the Register message during the step S-720, the S-CSCF node 96 may subsequently request multimedia authentication, location update and user data for the UE to the HSS 93 during respective steps S-725, S-735 and S-745, and the HSS 93 may respectively answer these requests during steps S-730, S-740 and S-750.

The HSS 93 may provide PCC deployment information to the S-CSCF node 96, according to embodiments of the invention, in any one of the answers provided during the steps S-730, S-740 and S-750 but, preferably, in the answer for the user data request and along with the user profile.

Upon receipt of the PCC deployment information, the S-CSCF node 96 may determine whether or not contacting a PCRF, based on the PCC deployment information, and this determination is negative in this case and not illustrated in FIG. 7. Then, the S-CSCF node sends during a step S-755 a 200 OK message, including the received PCC deployment information, to the I-CSCF node 95.

At this stage, the S-CSCF node 96 had received the PCC deployment information from a previous node, namely from the HSS 93 during the step S-750, and may thus be considered the current node determining, based on the PCC deployment information, that a PCRF node will not be contacted and, without initiating a session with any PCRF node, the S-CSCF node 96 as current node forwards the PCC deployment information towards a further node, namely the I-CSCF node 95.

Upon receipt of the 200 OK message with the PCC deployment information during the step S-755, the I-CSCF node 95 may determine whether or not contacting a PCRF, based on the PCC deployment information, and this determination is negative also in this case and not illustrated in FIG. 7. Then, the I-CSCF node 95 forwards during a step S-760 the 200 OK message, including the received PCC deployment information, to the P-CSCF node 94.

At this stage, the I-CSCF node 95 had received the PCC deployment information from a previous node, namely from the S-CSCF node 96 during the step S-755, and may thus be considered the current node determining, based on the PCC deployment information, that a PCRF node will not be contacted and, without initiating a session with any PCRF node, the I-CSCF node 95 as current node forwards the PCC deployment information towards a further node, namely the P-CSCF node 94.

Upon receipt of the 200 OK message with the PCC deployment information during the step S-760, the P-CSCF node 94 determines during a step S-765 a PCRF to be contacted, based on whether the received PCC deployment information includes the P-CSCF for the PCC interface Rx. For example, in the Table 1 above, the P-CSCF node 94 may find:

| P-CSCF | Rx | Yes | aa.bb.cc.dd |
| --- | --- | --- | --- |

The P-CSCF node 94 reads its name for the PCC interface Rx in the received PCC deployment information, and finds the PCRF address aa.bb.cc.dd identifying the PCRF node to be contacted.

Then, the P-CSCF node 94 establishes an Rx session with the PCRF node 1 during a step S-770.

At this stage, the P-CSCF node 94 had received the PCC deployment information from a previous node, namely from the I-CSCF node 95 during the step S-760, and may thus be considered the current node determining that a PCRF node has to be contacted, based on the PCC deployment information, and initiating a session with the PCRF node identified by a corresponding PCRF address.

Still with reference to FIG. 7, the method in this third embodiment is completed by acknowledging the session created from the PCRF node 1 to the P-CSCF node 94 during a step S-780, and by confirming the registration from the P-CSCF node 94 to the UE 90 during a step S-775.

Apart from the embodiments explained above with reference to FIG. 10 and FIG. 11 for the subscriber database, intermediate nodes and final nodes, other embodiments are foreseeable for these entities.

FIG. 12 illustrates an exemplary subscriber database like the HSS 93. This HSS may comprise at least one memory 9310 configured to store subscriber data for at least one UE to access a core network, and PCC deployment information to allow a node of the core network in selecting a PCRF node of a PCC architecture with one or more PCRF nodes. This HSS may also comprise a receiver 9340 configured to receive, from a node of the core network, a request for subscriber data applicable for the UE. This HSS may also comprise a processor 9320 configured to determine PCC deployment information and subscriber data to be provided to the node of the core network, wherein the PCC deployment information identifies one or more PCC interfaces that apply for the UE and, for each of the one or more PCC interfaces, at least one node of the core network that requires to contact a PCRF node identified by a PCRF address. This HSS may also comprise a transmitter 9350 configured to send, to the node of the core network, the PCC deployment information and the subscriber data. In an embodiment, the receiver 9340 and the transmitter 9350 may be implemented with a transceiver 9330.

FIG. 13 illustrates an exemplary intermediate node like any one of MME/S4-SGSN 91, SGSN, SGW 24, S-CSCF 96 and I-CSCF 95. This exemplary intermediate node may comprise a receiver 2457 configured to receive, from a previous node, PCC deployment information identifying one or more PCC interfaces that apply for the UE and, for each of the one or more PCC interfaces, at least one node of the core network that requires to contact a PCRF node identified by a PCRF address. In particular, when the intermediate node is the MME/S4-SGSN 91 or SGSN, the previous node may be the HSS 93; when the intermediate node is the SGW 24, the previous node may be the MME/S4-SGSN 91; when the intermediate node is the S-CSCF 96, the previous node may be the HSS 93; and when the intermediate node is the I-CSCF 95, the previous node may be the S-CSCF 96.

The exemplary intermediate node illustrated in FIG. 13 may also comprise at least one memory 2415 configured to store the received PCC deployment information, and at least one processor 2425 configured to determine whether a PCRF node has to be contacted, based on the PCC deployment information. If this processor 2425 determines that the PCRF node has to be contacted, the processor is configured to initiate, through a transmitter 2446 and a further receiver 2456, a session with the PCRF node 1 identified by the corresponding PCRF address.

This exemplary intermediate node illustrated in FIG. 13 may also comprise a further transmitter 2447 configured to forward the PCC deployment information to a further node. In particular, when the intermediate node is the MME/S4-SGSN 91, the further node may be the SGW 24; when the intermediate node is the SGSN, the further node may be the GGSN; when the intermediate node is the SGW 24, the further node may be the PGW 22; when the intermediate node is the S-CSCF 96, the further node may be the I-CSCF 95; and when the intermediate node is the I-CSCF 95, the further node may be the P-CSCF 94.

In an embodiment for the exemplary intermediate node, both transmitters 2446 and 2447 may be implemented with an integral transmitter 2445, and both receivers 2456 and may be implemented with an integral receiver 2455.

FIG. 14 illustrates an exemplary final node like any one of PGW 22, GGSN, and P-CSCF 94. This exemplary final node may comprise a receiver 2250 configured to receive, from a previous node, PCC deployment information identifying one or more PCC interfaces that apply for the UE and, for each of the one or more PCC interfaces, at least one node of the core network that requires to contact a PCRF node identified by a PCRF address. In particular, when the final node is the PGW 22, the previous node may be the SGW 24; when the final node is the GGSN, the previous node may be the SGSN; when the final node is the P-CSCF 94, the previous node may be the I-CSCF 95.

The exemplary final node illustrated in FIG. 14 may also comprise at least one memory 2210 configured to store the received PCC deployment information, and at least one processor 2220 configured to determine whether a PCRF node has to be contacted, based on the PCC deployment information. If this processor 2220 determines that the PCRF node has to be contacted, the processor is configured to initiate, through a transmitter 2243 and a further receiver 2246, a session with the PCRF node 1 identified by the corresponding PCRF address. In an embodiment for the exemplary final node, the receiver 2246 and the transmitter 2243 may be implemented with a transceiver 2240.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method of selecting a Policy and Charging Rules Function, hereinafter PCRF, node of a Policy and Charging Control, hereinafter PCC, architecture, which comprises one or more PCRF nodes to be selectively contacted by one or more nodes of a core network, the method carried out at a current node of the core network and comprising:

receiving PCC deployment information from a previous node of the core network at the current node of the core network, wherein the current node of the core network is considered as a reference node to process the PCC deployment information, wherein the PCC deployment information identifies one or more PCC interfaces that apply for a User Equipment, hereinafter UE, and, for each of the one or more PCC interfaces, at least one node of the core network that requires to contact a PCRF node identified by a PCRF address;

determining whether a PCRF node has to be contacted, based on the received PCC deployment information, wherein the received PCC deployment information identifies that one of the one or more PCC interfaces applies for the UE and the current node, and, for the one of the one or more PCC interfaces that applies for the UE and the current node, whether the received PCC deployment information includes a corresponding PCRF address for the current node to contact the PCRF node; and if it is determined that the PCRF node has to be contacted, initiating a session with the PCRF node identified by the corresponding PCRF address; and if it is determined that the PCRF node does not have to be contacted, forwarding the PCC deployment information to a further node of the core network, wherein the further node is a next current node of the core network considered as a new reference node to process the PCC deployment information.

2. The method of claim 1, wherein determining a PCRF node has to be contacted comprises identifying a PCC interface in the PCC deployment information that the current node supports and, for the PCC interface, identifying the current node amongst the at least one node of the core network that requires to contact a PCRF node identified by a PCRF address.

3. The method of claim 1, wherein the previous node of the core network is a subscriber database holding subscriber data applicable for the UE, and wherein the current node receives the PCC deployment information when the UE accesses the core network through an access network.

4. The method of claim 3, wherein the subscriber database is a Home Subscriber Server, hereinafter HSS, the access network is an LTE network, the current node is a Mobility Management Entity, hereinafter MME, and the further node is a Serving Gateway, hereinafter SGW.

5. The method of claim 3, wherein the subscriber database is a Home Subscriber Server, hereinafter HSS, the access network is a GERAN/UTRAN network, the current node is a Serving GPRS Support Node supporting a so-called S4 interface, hereinafter S4-SGSN, and the further node is a Serving Gateway, hereinafter SGW.

6. The method of claim 3, wherein the subscriber database is a Home Subscriber Server, hereinafter HSS, the access network is a GERAN/UTRAN network connected to a General Packet Radio Service network, hereinafter GPRS network, the current node is a Serving GPRS Support Node, hereinafter SGSN, and the further node is a Gateway GPRS Support Node, hereinafter GGSN.

7. The method of claim 3, wherein the subscriber database is a Home Subscriber Server, hereinafter HSS, the core network is an IP Multimedia Subsystem, hereinafter IMS, core network, the current node is a Serving Call Session Control Function node, hereinafter S-CSCE node, and the further node is an Interrogating Call Session Control Function node, hereinafter I-CSCF node.

8. The method of claim 1, wherein the previous node of the core network is a node that receives the PCC deployment information from a subscriber database when the UE accesses the core network through an access network.

9. The method of claim 8, wherein the subscriber database is a Home Subscriber Server, hereinafter HSS, the access network is an LTE network, the previous node is a Mobility Management Entity, hereinafter MME, the current node is a Serving Gateway, hereinafter SGW, and the further node is one of a packet data network gateway, hereinafter PGW, and a PCRF node.

10. The method of claim 8, wherein the subscriber database is a Home Subscriber Server, hereinafter HSS, the access network is a GERANIUTRAN network, the previous node is a Serving GPRS Support Node supporting a so-called S4 interface, hereinafter S4-SGSN, the current node is a Serving Gateway, hereinafter SGW, and the further node is one of a packet data network gateway, hereinafter PGW, and a PCRF node.

11. The method of claim 8, wherein the subscriber database is a Home Subscriber Server, hereinafter HSS, the core network is an IP Multimedia Subsystem, hereinafter IMS, core network, the previous node is a Serving Call Session Control Function node, hereinafter S-CSCF node, the current node is an Interrogating Call Session Control Function node, hereinafter I-CSCE node, and the further node is a Proxy Call Session Control Function node, hereinafter P-CSCF node.

12. The method of claim 1, wherein the previous node of the core network is a Serving Gateway, hereinafter SGW and the current node is a packet data network gateway, hereinafter PGW, or the previous node of the core network is a PCRF node and the current node is a PGW, or the previous node of the core network is a Serving GPRS Support Node, hereinafter SGSN, and the current node is a Gateway GPRS Support Node, hereinafter GGSN, or the previous node of the core network is an Interrogating Call Session Control Function node, hereinafter I-CSCF node, and the current node is a Proxy Call Session Control Function node, hereinafter P-CSCF node.

13. The method of claim 1, wherein the PCC deployment information stored in a subscriber database further includes an applicability indicator to be used by the subscriber database in identifying relevant data for applicable scenarios.

14. The method of claim 1, wherein the PCC deployment information further indicates an operation that triggers contact with the PCRF node.

15. The method of claim 14, wherein initiating the session towards the PCRF node is carried out upon handling the operation that triggers the contact with the PCRF node.

16. A method of selecting a Policy and Charging Rules Function, hereinafter PCRF, node of a Policy and Charging Control, hereinafter PCC, architecture, which comprises one or more PCRF nodes to be selectively contacted by one or more nodes of a core network, the method carried out at a subscriber database of the core network and comprising:
  upon a User Equipment, hereinafter UE, accessing the core network, receiving at the subscriber database from a previous node of the core network, a request for subscriber data applicable for the UE, wherein the subscriber database is a current node of the core network referred to as a reference node of the core network processing PCC deployment information;
  determining, at the subscriber database, PCC deployment information and subscriber data to be provided to a further node of the core network, wherein the PCC deployment information identifies one or more PCC interfaces that apply for the UE and, for each of the one or more PCC interfaces, whether the PCC deployment information includes a corresponding PCRF address for the further node to contact one or more PCRF nodes, and at least one node of the core network that requires to contact a PCRF node identified by a PCRF address; and
  sending the PCC deployment information and the subscriber data from the subscriber database to the further node of the core network, wherein the further node is a next current node of the core network, considered as a new reference node to process the PCC deployment information, to enable the further node to:
    determine, based on the PCC deployment information, whether a PCRF node has to be contacted; and
    based on the determination of whether the PCRF node has to be contacted, initiate a session with the PCRF node identified by the corresponding PCRF address or forward the PCC deployment information to a still further node of the core network to process the PCC deployment information.

17. A current node of a core network, configured to interact with a Policy and Charging Rules Function, hereinafter PCRF, node of a Policy and Charging Control, hereinafter PCC, architecture, which comprises one or more PCRF nodes for controlling communications of a User Equipment, hereinafter UE, in the core network, the current node comprising:
  at least one processor; and
  at least one memory that stores processor-executable instructions, wherein the at least one processor interfaces with the at least one memory to execute the processor-executable instructions, whereby said current node is operable to:
    receive, from a previous node of the core network at the current node of the core network, wherein the current node of the core network is considered as a reference node to process PCC deployment information, the PCC deployment information identifying one or more PCC interfaces that apply for the UE and, for each of the one or more PCC interfaces, at least one node of the core network that requires to contact a PCRF node identified by a PCRF address;

determine whether a PCRF node has to be contacted, based on the received PCC deployment information, wherein the received PCC deployment information identifies that one of the one or more PCC interfaces applies for the UE and the current node, and, for the one of the one or more PCC interfaces that applies for the UE and the current node, whether the received PCC deployment information includes a corresponding PCRF address for the current node to contact the PCRF node; and if it is determined that the PCRF node has to be contacted, initiate a session with the PCRF node identified by the corresponding PCRF address, and if it is determined that the PCRF node does not have to be contacted, forwarding the PCC deployment information to a further node of the core network, wherein the further node is a next current node of the core network considered as a new reference node to process the PCC deployment information.

18. The current node of claim 17, in determining the PCRF node has to be contacted, is further operable to identify a PCC interface in the PCC deployment information that the current node supports and, for that PCC interface, to identify the current node amongst the at least one node of the core network that requires to contact a PCRF node identified by a PCRF address.

19. The current node of claim 17, wherein the previous node of the core network is a subscriber database holding subscriber data applicable for the UE, and wherein the current node is operable to receive the PCC deployment information when the UE accesses the core network through an access network.

20. The current node of claim 19, wherein the subscriber database is a Home Subscriber Server, hereinafter HSS, the access network is an LTE network, the current node is a Mobility Management Entity, hereinafter MME, and the further node is a Serving Gateway, hereinafter SGW.

21. The current node of claim 19, wherein the subscriber database is a Home Subscriber Server, hereinafter HSS, the access network is a GERAN/UTRAN network, the current node is a Serving GPRS Support Node supporting a so-called S4 interface, hereinafter S4-SGSN, and the further node is a Serving Gateway, hereinafter SGW.

22. The current node of claim 19, wherein the subscriber database is Home Subscriber Server, hereinafter HSS, the access network is a GERAN/UTRAN network connected to a General Packet Radio Service network, hereinafter GPRS network, the current node is a Serving GPRS Support Node, hereinafter SCGSN, and the further node is a Gateway GPRS Support Node, hereinafter GGSN.

23. The current node of claim 19, wherein the subscriber database is a Home Subscriber Server, hereinafter HSS, the core network is an IP Multimedia Subsystem, hereinafter IMS, core network, the current node is a Serving Call Session Control Function node, hereinafter S-CSCF node, and the further node is an Interrogating Call Session Control Function node, hereinafter I-CSCF node.

24. The current node of claim 17, wherein the previous node of the core network is a node that receives the PCC deployment information from a subscriber database when the UE accesses the core network through an access network.

25. The current node of claim 24, wherein the subscriber database is a Home Subscriber Server, hereinafter HSS, the access network is an LTE network, the previous node is a Mobility Management Entity, hereinafter MME, the current node is a Serving Gateway, hereinafter SGW, and the further node is one of a packet data network gateway, hereinafter PGW, and a PCRF node.

26. The current node of claim 24, wherein the subscriber database is a Home Subscriber Server, hereinafter HSS, the access network is a GERAN/UTRAN network, the previous node is a Serving GPRS Support Node supporting a so-called S4 interface, hereinafter S4-SGSN, the current node is a Serving Gateway, hereinafter SGW, and the further node is one of a packet data network gateway, hereinafter PGW, and a PCRF node.

27. The current node of claim 24, wherein the subscriber database is a Home Subscriber Server, hereinafter HSS, the core network is an IP Multimedia Subsystem, hereinafter IMS, core network, the previous node is a Serving Call Session Control Function node, hereinafter S-CSCF node, the current node is an Interrogating Call Session Control Function node, hereinafter I-CSCF node, and the further node is a Proxy Call Session Control Function node, hereinafter P-CSCF node.

28. The current node of claim 17, wherein the previous node of the core network is a Serving Gateway, hereinafter SGW and the current node is a packet data network gateway, hereinafter PGW, or the previous node of the core network is a PCRF node and the current node is a packet data network gateway, hereinafter PGW, or the previous node of the core network is a Serving GPRS Support Node, hereinafter SGSN and the current node is a Gateway GPRS Support Node, hereinafter GGSN, or the previous node of the core network is an Interrogating Call Session Control Function node, hereinafter I-CSCF node, and the current node is a Proxy Call Session Control Function node, hereinafter P-CSCF node.

29. The current node of claim 17, wherein the PCC deployment information further indicates an operation that triggers contact with the PCRF node.

30. The current node of claim 29, operable to initiate the session with the PCRF node upon handling the operation that triggers the contact with the PCRF node.

31. A subscriber database for holding subscriber data applicable for a User Equipment, hereinafter UE, to access a core network and for allowing a node of the core network to select a Policy and Charging Rules Function, hereinafter PCRF, node of a Policy and Charging Control, hereinafter PCC, architecture, which comprises one or more PCRF nodes, the subscriber database, which is a current node of the core network referred to as a reference node of the core network processing PCC deployment information, comprising:

at least one processor; and
at least one memory that stores processor-executable instructions, wherein the at least one processor interfaces with the at least one memory to execute the processor-executable instructions, whereby said subscriber database is operable to:
receive, from a previous node of the core network, a request for subscriber data applicable for the UE;
determine PCC deployment information and subscriber data to be provided to a further node of the core network, wherein the PCC deployment information identifies one or more PCC interfaces that apply for the UE and, for each of the one or more PCC interfaces, whether the PCC deployment information includes a corresponding PCRF address for the further node to contact one or more PCRF nodes, and at least one node of the core network that requires to contact a PCRF node identified by a PCRF address; and send, to the further node of the core network, the PCC deployment information and the subscriber data, wherein the further node is a next current node of the core network, considered as a new reference node to process the PCC deployment information, to enable the further node to:

determine, based on the PCC deployment information, whether a PCRF node has to be contacted; and based on the determination of whether the PCRF node has to be contacted, initiate a session with the PCRF node identified by the corresponding PCRF address or forward the PCC deployment information to a still further node of the core network to process the PCC deployment information.

32. The subscriber database of claim 31, wherein the PCC deployment information further includes an applicability indicator to he used by the subscriber database in identifying relevant data for applicable scenarios.

33. The subscriber database of claim 31, wherein the PCC deployment information further indicates an operation that triggers contact with the PCRF node.

34. The subscriber database of claim 32, further operable to act as a Home Subscriber Server, hereinafter HSS.

* * * * *